United States Patent
Lundvall et al.

(10) Patent No.: US 8,755,101 B2
(45) Date of Patent: Jun. 17, 2014

(54) METHOD OF PRODUCING A MICROSTRUCTURED PRODUCT

(75) Inventors: Axel Lundvall, Solna (SE); Fredrik Nikolajeff, Stockholm (SE); Fredrik Gustavsson, Lidingö (SE); Robert Eklund, Österskär (SE)

(73) Assignee: Rolling Optics AB, Stockholm (SE)

( * ) Notice: Subject to any disclaimer, the term of this patent is extended or adjusted under 35 U.S.C. 154(b) by 625 days.

(21) Appl. No.: 12/810,672

(22) PCT Filed: Dec. 19, 2008

(86) PCT No.: PCT/SE2008/051538
§ 371 (c)(1),
(2), (4) Date: Oct. 6, 2010

(87) PCT Pub. No.: WO2009/085004
PCT Pub. Date: Jul. 9, 2009

(65) Prior Publication Data
US 2011/0058239 A1  Mar. 10, 2011

(30) Foreign Application Priority Data

Dec. 28, 2007  (SE) ........................................ 0702914
Apr. 4, 2008  (SE) ........................................ 0800766

(51) Int. Cl.
  *G03H 1/08*  (2006.01)
(52) U.S. Cl.
  USPC ............................................................. 359/9
(58) Field of Classification Search
  USPC .................. 359/618–626, 9, 2, 463; 264/40.1
  See application file for complete search history.

(56) References Cited

U.S. PATENT DOCUMENTS

| 3,241,429 A | | 3/1966 | Rice et al. | |
| 5,461,495 A | * | 10/1995 | Steenblik et al. | ............. 359/463 |
| 5,912,767 A | * | 6/1999 | Lee | ............................... 359/567 |

(Continued)

FOREIGN PATENT DOCUMENTS

| JP | H03282304 A | 12/1991 |
| JP | H11291696 A | 10/1999 |

(Continued)

OTHER PUBLICATIONS

International Search Report, International Application PCT/SE08/51538. WIPO (ISA/SE), Mar. 25, 2009.
Japanese Patent Office, Office Action, Japanese Application No. 2010-540618, issued Jul. 19, 2013.

*Primary Examiner* — James Greece
*Assistant Examiner* — Jie Lei
(74) *Attorney, Agent, or Firm* — The Marbury Law Group PLLC

(57) ABSTRACT

The present invention provides a method of producing a two-sided microstructured product and a registration structure that can be used for the method. The method comprises the steps of: (800) providing primary product features (80) at a first surface of a substrate sheet (50); (810) providing secondary product features (90) at an opposed surface; (820) registering the mutual alignment of the primary and secondary product features (80, 90) to estimate alignment parameters; and (830) aligning the provision of primary and secondary product features (80, 90). The registration structure comprises a registration-array of focusing elements (20) at a first surface and a registration-array of reference objects (30) at an opposed surface aligned with primary and secondary product features (80,90) that provides a holographic representation (10) of the reference objects (30) in order to estimate the alignment of product features (80,90).

27 Claims, 16 Drawing Sheets

(56) References Cited

U.S. PATENT DOCUMENTS

| | | |
|---|---|---|
| 6,373,636 B1 | 4/2002 | Conley |
| 7,002,748 B1 * | 2/2006 | Conley et al. ............... 359/619 |
| 7,417,798 B2 * | 8/2008 | King et al. .................. 359/619 |
| 2003/0075269 A1 | 4/2003 | Prix et al. |
| 2007/0137568 A1 | 6/2007 | Schreiber |
| 2007/0151468 A1 | 7/2007 | Strand |

FOREIGN PATENT DOCUMENTS

| | | |
|---|---|---|
| JP | 2005172686 A | 6/2005 |
| JP | 2006098718 A | 4/2006 |
| WO | 2006098934 A1 | 9/2006 |

* cited by examiner

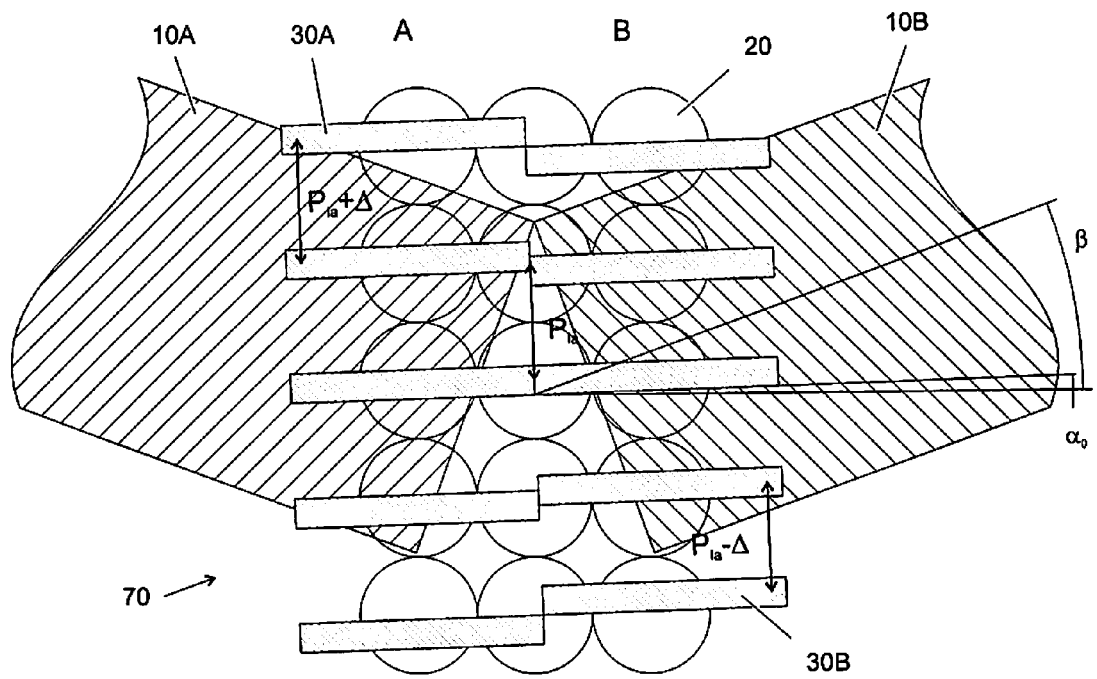
Fig. 5c
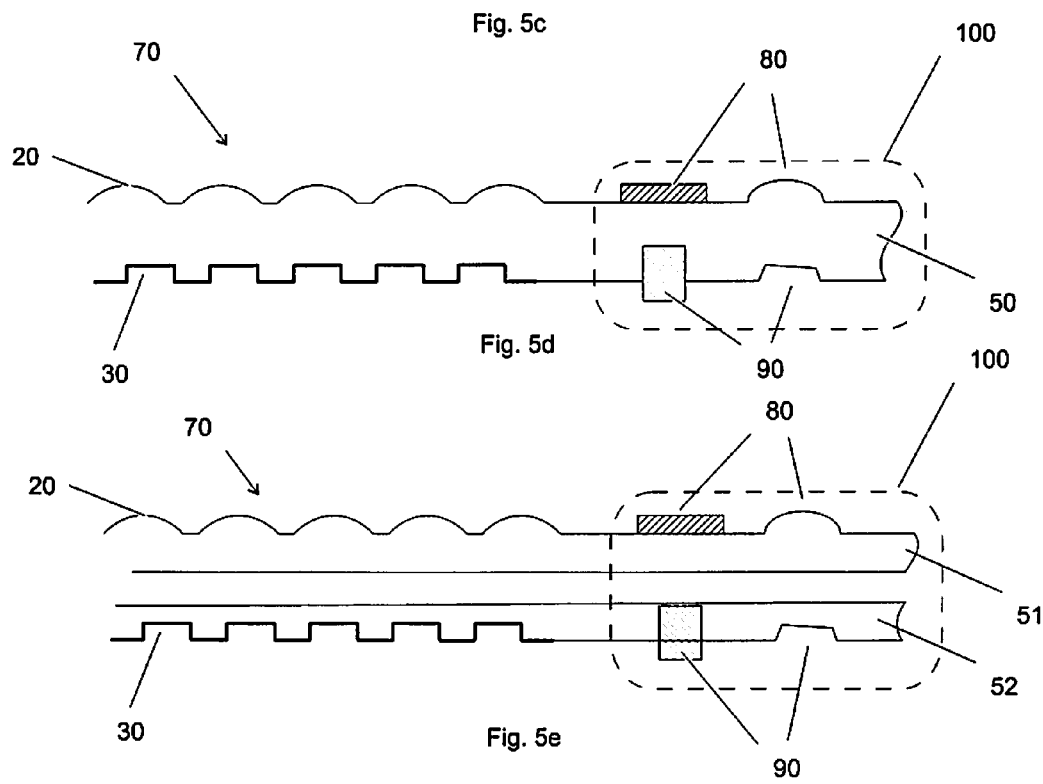
Fig. 5d
Fig. 5e

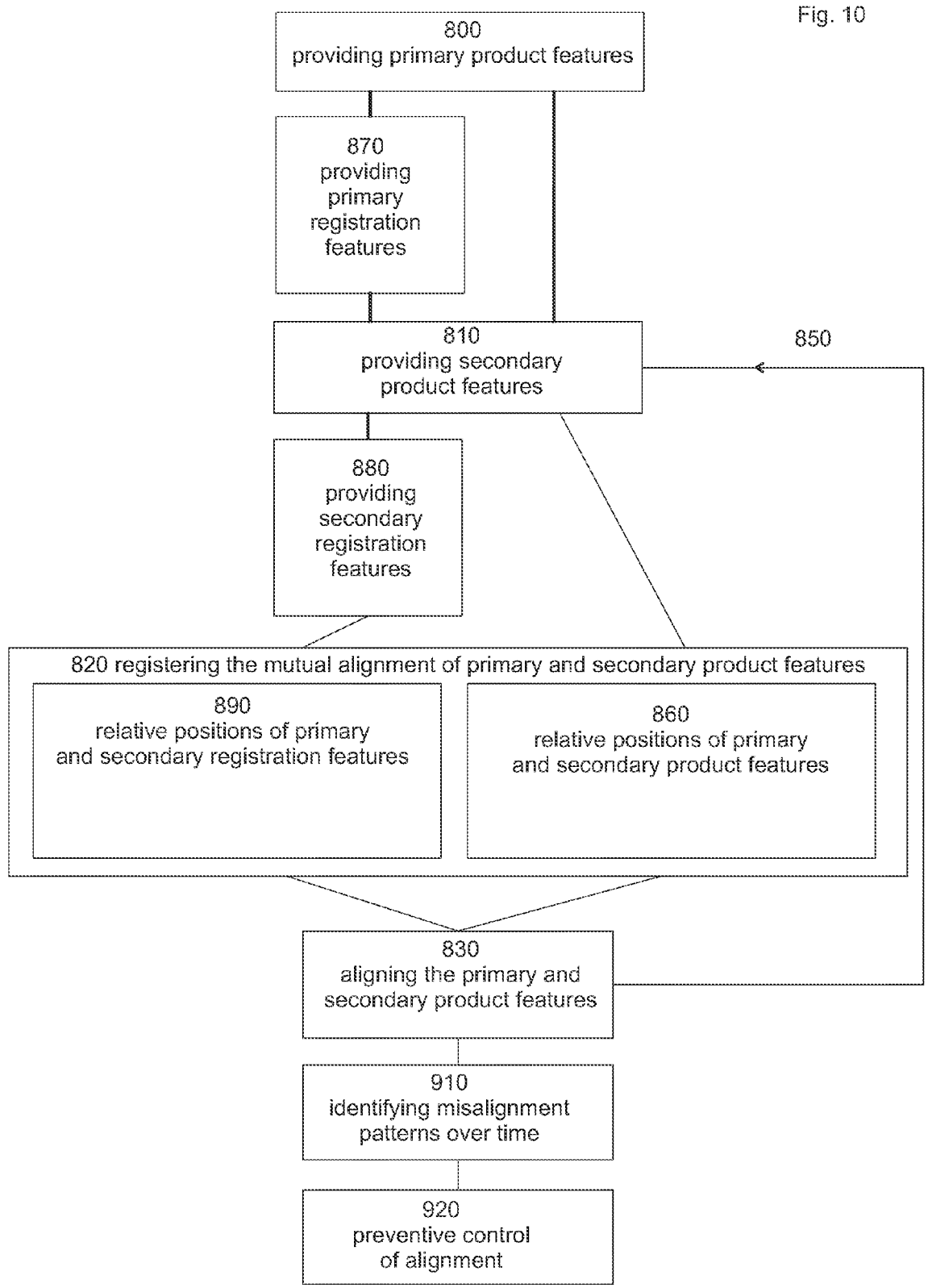

METHOD OF PRODUCING A MICROSTRUCTURED PRODUCT

THE FIELD OF THE INVENTION

The present invention relates to microstructured products, more in detail the invention relates to a method for producing a two sided microstructured product and an arrangement for producing such.

BACKGROUND OF THE INVENTION

In many product segments, proper registration or alignment of product features is of great importance. Examples of such products are: synthetic image devices, holographic devices, brightness enhancement devices, retroreflective devices, electronic circuit devices, microfluidic devices, different types of display devices, and combinations thereof. Other examples may be of more chemical nature such as, electrochemical devices, electrochromic devices, bioassay devices, etc. Alignment of product features is often related to the subsequent steps of providing product features in or on a surface of a substrate, wherein product features of one step shall interact (or be prevented from interaction with) product features of a subsequent step. Some products may comprise primary product features on a first side of a substrate and secondary product features on the opposed side of the substrate, while other products comprises three or more aligned sets of product features.

SUMMARY OF THE INVENTION

One object of the present invention is to provide two-sided microstructured products with a high degree of alignment between product features on the respective sides of the substrate.

The above object is in a first aspect of the invention achieved by a method of producing a two-sided microstructured product as defined in the first independent claim, in second aspect of the invention achieved by a registration structure as defined in the second independent claim, in a third aspect of the invention achieved by a two-sided microstructured product as defined in the third independent claim and in a fourth aspect of the invention achieved by an arrangement for producing such a product in accordance with the last independent claim.

One advantage with the registration structure is that it allows enhanced registration accuracy for in plane alignment using pure visual means.

Another advantage is that it provides for intuitive indication of both translational and rotational deviations.

Still another advantage is that it enables both manual visual and automatic evaluation of deviations.

Embodiments of the invention are defined in the claims. Other objects, advantages and novel features of the invention will become apparent from the following detailed description of the invention when considered in conjunction with the accompanying drawings and claims.

BRIEF DESCRIPTION OF THE DRAWINGS

Preferred embodiments of the invention will now be described with reference to the accompanying drawings, wherein:

FIGS. 5a to 5d schematically show one embodiment of a registration structure comprising a registration-array;

FIG. 5e schematically shows another embodiment of a registration structure comprising a registration-array;

FIG. 10 is a scheme of a method of producing a product in accordance with the present invention;

DETAILED DESCRIPTION OF PREFERRED EMBODIMENTS

Figure 1:
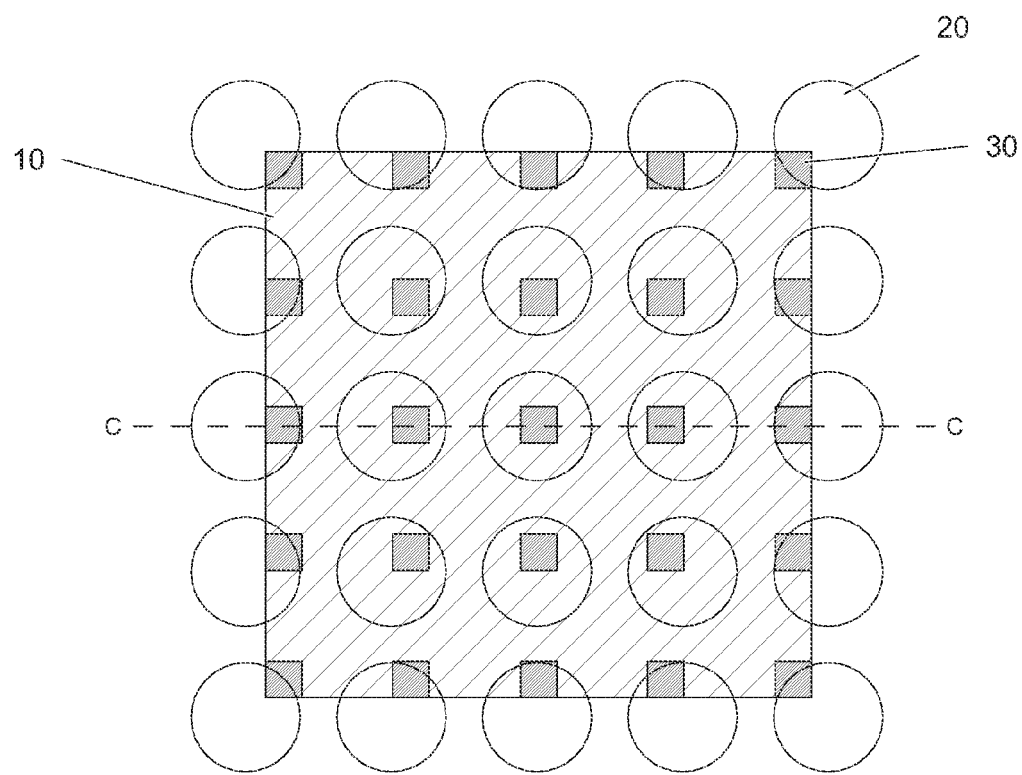
FIGS. 1 and 2a schematically show the principles behind a holographic representation of moiré-type.
Figure 2A:
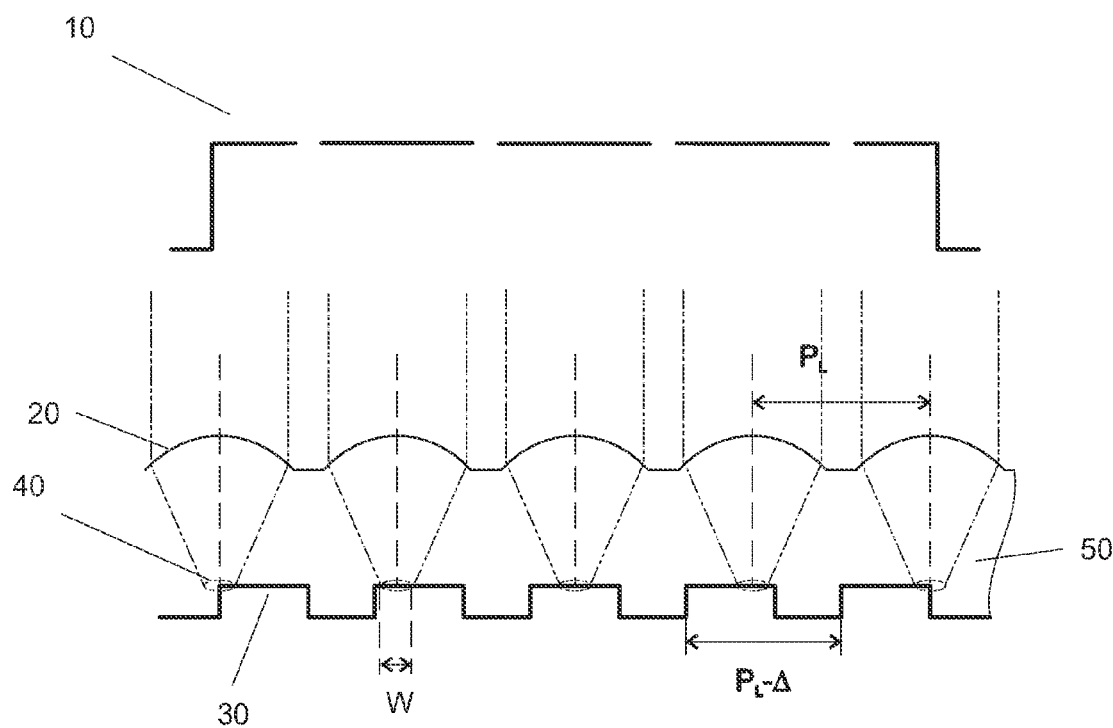

FIGS. 1 and 2a schematically illustrate an array of micro lenses 20 and an associated array of image objects 30. In FIG. 1 each lens is for illustratively purposes shown as a circle 20 and each image object as a square 30. As is illustrated, each micro lens 20 is arranged to magnify a small section 40 of an associated image object 30 so that a synthetic integral three-dimensional image is perceived when viewed at a distance from the array of micro lenses 20. In the field of art, this magnification effect is commonly named moiré-magnification and it is used in holography. Hence for the purpose of this application the synthetic integral three-dimensional image is for the purpose of this application referred to as a holographic representation 10 and FIGS. 1 and 2a schematically show the principles behind a holographic representation 10 of moiré-type. FIG. 2a shows more in detail how the holographic representation 10 of the image object along the line C-C of FIG. 1 is constructed. The micro lenses 20 are arranged at a distance from the image objects 30 that is substantially equal to its focal distance as is indicated by the dotted lines in FIG. 2a. However, as is well known in the field, an intentional deviation from the focal distance may be selected and the structures adapted thereto. By arranging the micro lenses 20 at a first surface of a substantially transparent substrate sheet 50 of suitable thickness and the image objects 30 at an opposed surface, the correct distance may be provided over the arrays. As is indicated, the period of repetition between two successive micro lenses 20 in the C-C direction is $P_L$, and the period of repetition between two successive image objects in the same direction is $P_O = P_L - \Delta$. In order to achieve a proper integral representation, the shift $\Delta$ of the image objects is selected so that the sections of the image object viewed through two adjacent micro lenses are essentially adjacent and therefore gives rise to a perceived representation of a magnified image object. In FIG. 2a the image objects 30 are disclosed as being formed in the opposed surface of the substrate sheet 50, but the image objects may also be formed on the opposed surface or the substrate sheet 50 may comprises a first and a second foil wherein the micro lenses 20 are arranged at a surface of the first foil and the image objects are arranged at a surface of the second foil and the first and second foils are e.g. laminated together to form the substrate sheet 50. According to the present invention, the image objects need not to be extended in a direction normal to the surface of the substrate sheet, i.e. the "thickness" direction.

The magnification factor m achieved by Moiré-magnification of this type is given by the following expression:

$$m = P_L/(P_L - P_O) = P_L/\Delta, \quad (1)$$

Following this, the magnification is greater for smaller values of the shift $\Delta$. Typical values of the lens period of repetition $P_L$ are 10 μm or less and up to 200 μm or more, and typical values of the shift $\Delta$ are 0.1 μm or less and up to 5 μm or more, depending on the representation effect desired. Hence, the magnification effect that can be achieved may be from a few times up to several thousand times.

Figure 2B:
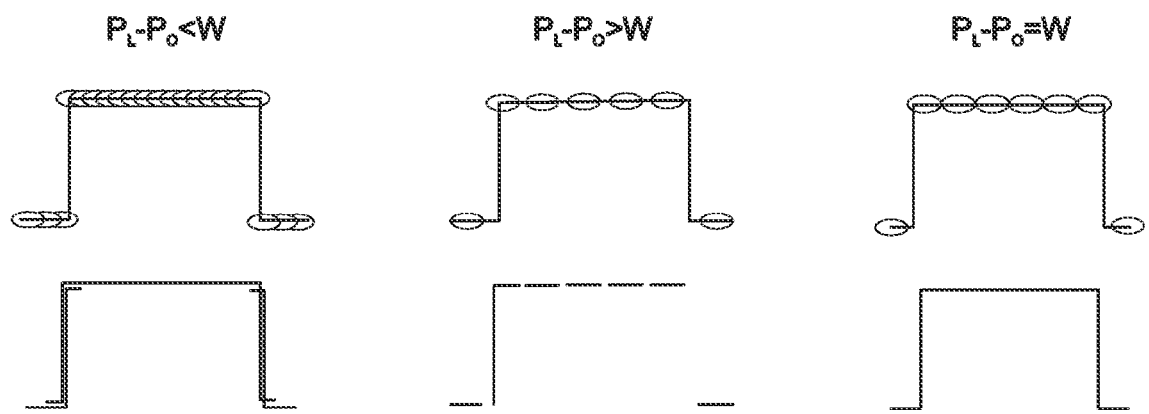
FIG. 2b schematically illustrates varying completeness in the holographic representation.

With reference to FIG. 2b, the width W of the small section of the image object 30 is dependent on the focusing at this distance from the micro-lens 20. The width W is determined by the distance between the micro-lens 20 and the image object 30 and the properties of the micro-lens 20. Aberration (spherical, astigmatism, chromatic) may give an increase in width W and by choosing a distance close to the focal point the width W can be minimized. If the width W is equal to $\Delta$ the image object 30 will be completely represented in the magnified integral image. If W is less than $\Delta$ the image object 30 will be incompletely represented, i.e. there will be a lack of information in the holographic representation 10, and opposed to that, if W is larger than $\Delta$ one part of the image object will be imaged by two adjacent micro-lenses, i.e. there is overlapping information in the holographic representation.

Figure 3A:
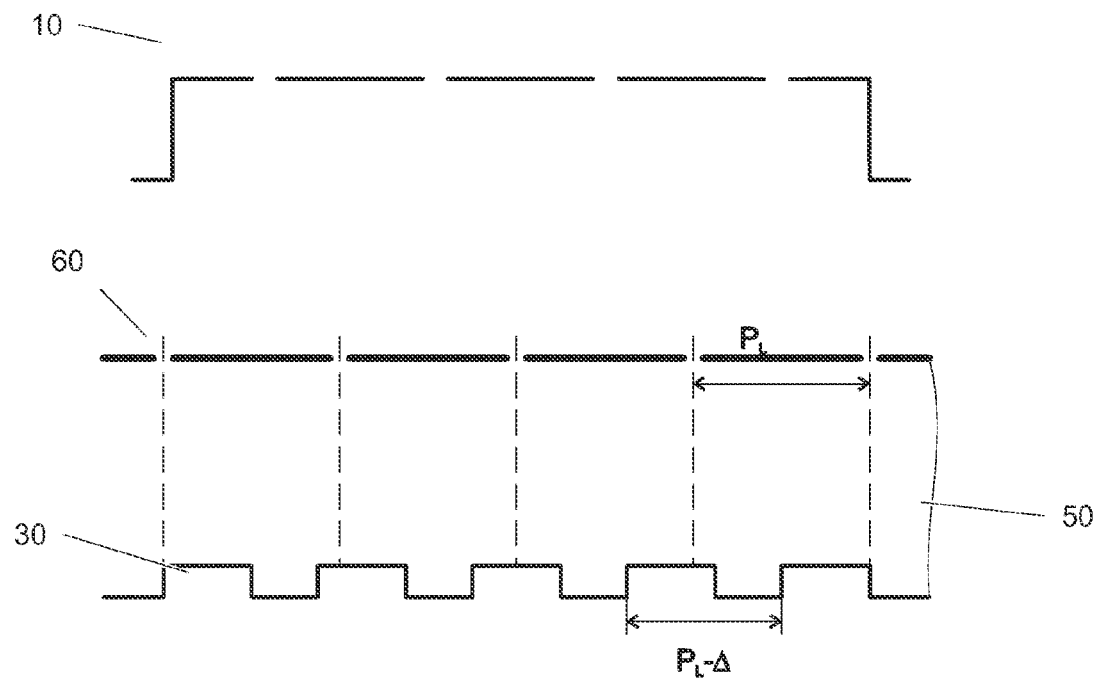
FIGS. 3a and 3b schematically show two alternative embodiments for providing a holographic representation according to FIG. 1.
Figure 3B:
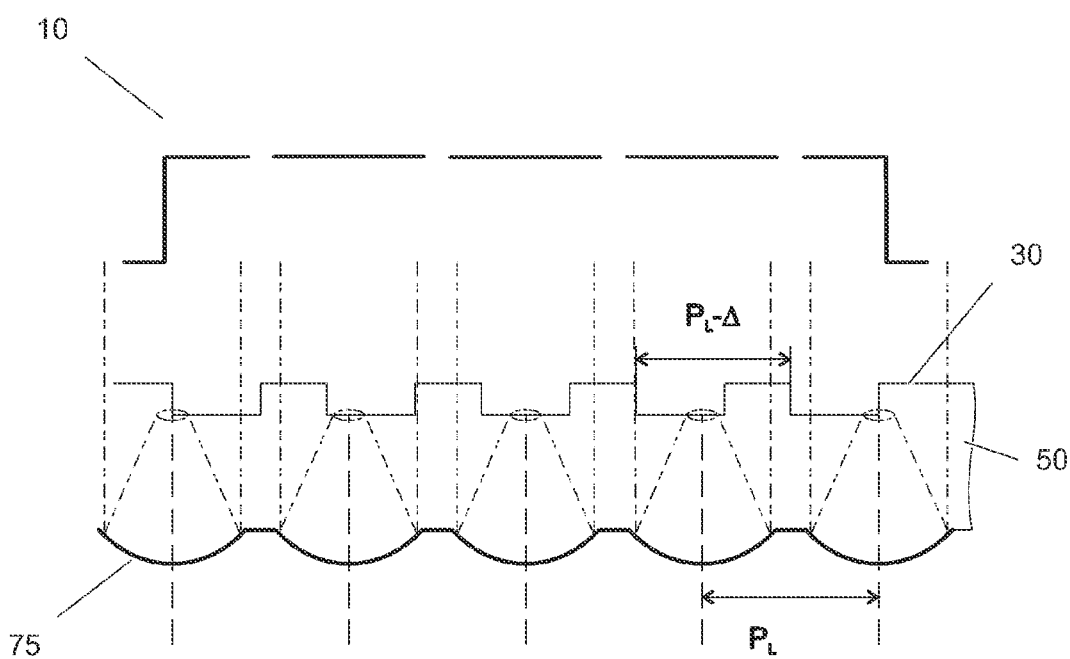

FIGS. 3a and 3b schematically show two alternative embodiments for providing a holographic representation according to FIG. 1. In FIG. 3a, the array of micro lenses is replaced by an array of micro apertures 60, and each micro aperture 60 restricts the view of the associated image object 30 so that the integral view 10 is perceived through the array of micro apertures 60. In FIG. 3b, the array of image objects 30 is at least partly transparent, and the array of micro lenses is replaced by an array of focusing micro mirrors 75. When viewed from the image object side, each mirror 75 provides a focused view of a predetermined section of the associated image object 30, and the integral view is perceived as a holographic representation 10 of the image object 30.

Herein, any element capable of focusing at a section of and/or restricting the view of an associated image object, as illustrated above, will be referred to as a focusing element 20. Examples of such focusing elements 20 are various types of micro lenses, apertures, mirrors, or the like.

Figure 4A:
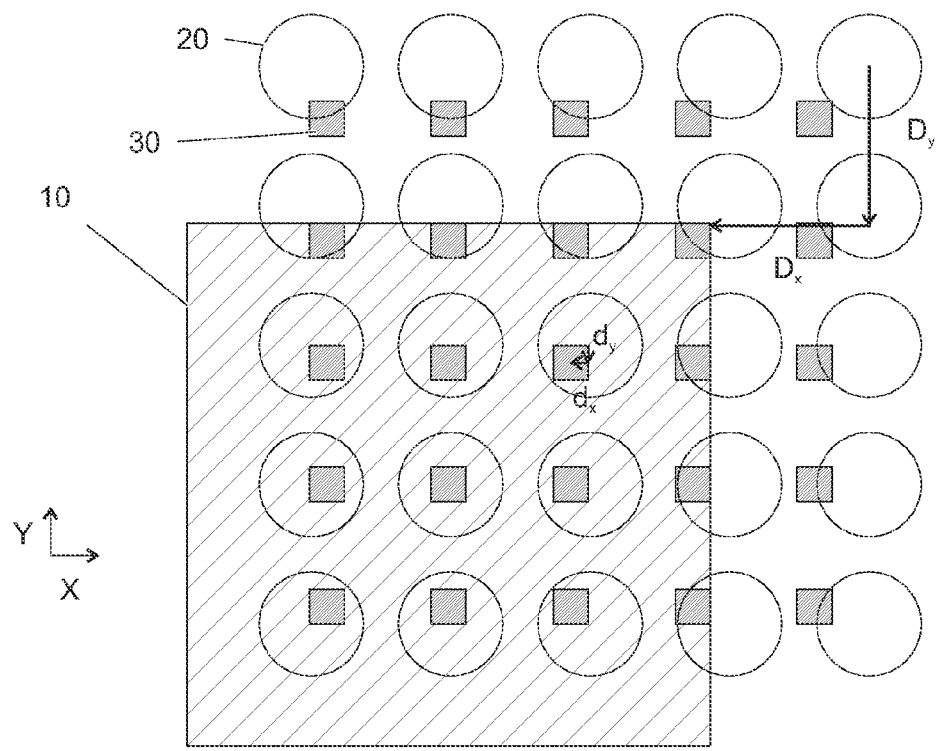
FIGS. 4a and 4b show schematic examples of the moiré-type holographic representation of the image objects according to FIG. 1, but wherein the array of image objects is misaligned with reference to the array of focusing elements.
Figure 4B:
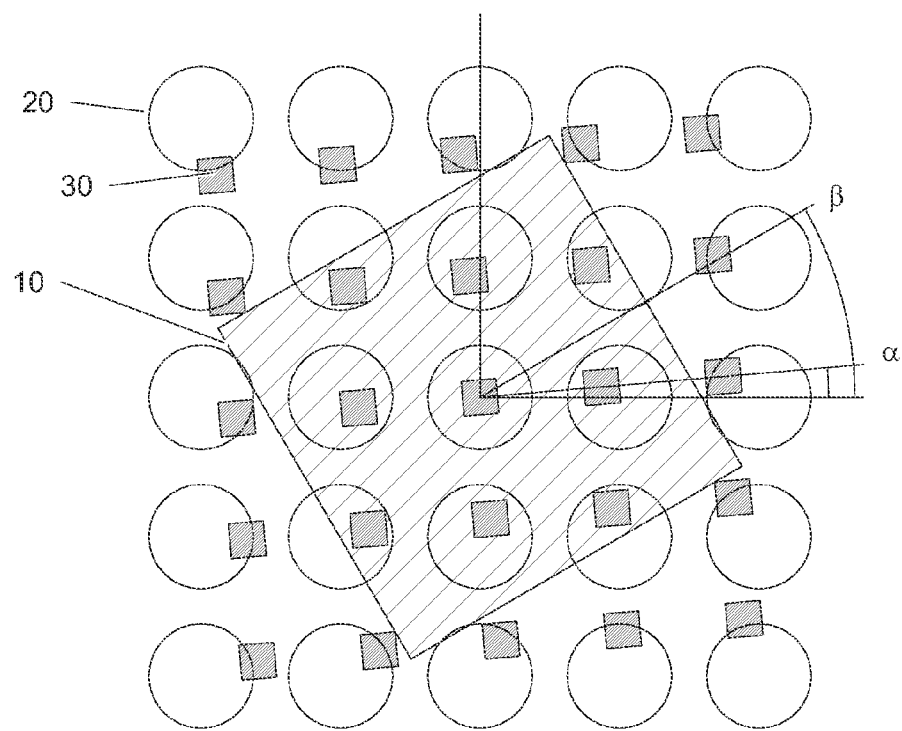

FIGS. 4a and 4b shows schematic examples of the moiré-type holographic representation 10 of the image objects 30 according to FIG. 1, but wherein the array of image objects 30 is misaligned with reference to the array of focusing elements 20 (micro mirrors). In FIG. 4a, the array of image objects 30 is shifted in the x and y directions by $d_x$ and $d_y$, respectively, with respect to the array of focusing elements 20. Due to the magnifying effect, the shift $d_x$ and $d_y$ results in a translation of the moiré-type holographic representation 10 by $D_x$ and $D_y$, wherein $D_x \approx m^* d_x$ and $D_y \approx m^* d_y$. Thus, a shift of pure translational nature, results in a magnified translation of the holographic representation.

In FIG. 4b, the array of image objects 30 is shifted by a rotation $\alpha$ with respect to the array of focusing elements 20. As can be seen in the figure, the prescribed relationship between adjacent focusing elements 20 and their associated image objects 30 is now distorted which leads to an illogical movement of the holographic representation 10. The resulting holographic representation 10 is rotated by $\beta$ which represents a magnification of the rotation achieved by the magnifying effect, but the size of the holographic representation 10 of the image object is reduced compared to when in the aligned state. The moiré magnification for a rotational shift is dependent on the angel of rotation according to the approximation:

$$m(\alpha) = P_L/(P_L - P_O \cos(\alpha)), \quad (2)$$

For small rotational misalignments, i.e. when $\alpha \approx 0$, it is possible to estimate the angular magnification by equation (1), because $\cos(0) = 1$. Misalignment shifts in the two dimensional plane is therefore suitably split in three degrees of freedom: translation in x and y directions and rotation $\alpha$. The shift of the holographic representation 10 of the image objects resulting from an arbitrary shift in the plane $(x_0, y_0, \alpha_0)$, can therefore be approximated as $(m^* x_0, m^* y_0, m^* \alpha_0)$. Hence the rotational shift $\beta$ in FIG. 4b can be approximated as $m^* \alpha$.

According to one embodiment of the present invention schematically disclosed in FIGS. 5a to 5d, the magnifying effect of the moiré-type holographic representations 10A and 10B is introduced to improve the accuracy of a registration structure 70, which can be used in production of, or for inspection of, products with primary product features 80 at the first surface of a substrate sheet 50 and secondary product features 90 at the opposed surface of a substrate sheet 50. The registration structure 70 comprises a registration-array of focusing elements 20 at a first surface of a transparent section of the substrate sheet 50 and a registration-array of reference objects 30 at the opposed surface of the transparent section of the substrate sheet 50. The registration-array of focusing elements 20 is aligned with the primary product features 80 at the first surface of the substrate sheet 50 and the registration-array of reference objects 30 is aligned with the secondary product features 90 at the opposed surface of the substrate sheet 50.

According to one embodiment of the present invention schematically disclosed in FIG. 5e the moiré-type holographic representations 10A and 10B is introduced to improve the accuracy of a registration structure 70, which can be used to align primary product features 80 at a first surface of a first foil 51 and secondary product features 90 at an opposed surface of a second foil 52 when the first foil 51 is arranged on the second foil 52. The registration structure 70 comprises a registration-array of focusing elements 20 at a first surface of a transparent section of the first foil 51 and a registration-array of reference objects 30 at the opposed surface of a transparent section of the second foil 52. The registration-array of focusing elements 20 is aligned with the primary product features 80 at the first surface of the first foil 51 and the registration-array of reference objects 30 is aligned with the secondary product features 90 at the opposed surface of the second foil 52. By arranging the foils at a predetermined distance from each other, e.g. in contact, whereby the thickness of the foils determines the predetermined distance, the correct distance between the registration-array of focusing elements 20 and the registration-array of reference objects 30 may be provided, i.e. each focusing element 20 is arranged at a distance from an associated reference object 30 that is substantially equal to its focal distance. The alignment of primary and secondary product features 80, 90 of separate foils is for the purpose of this application to be considered analogously to alignment of primary and secondary product features 80, 90 of a substrate sheet 50. Further, in production of products with primary product features 80 at the first surface of a substrate sheet 50 and secondary product features 90 at the opposed surface of a substrate sheet 50 the substrate sheet is often referred to as a web, and accordingly the terms substrate sheet, foil and web are interchangeably used throughout the specification of this application.

As discussed above, the registration-array of focusing elements 20 may be an array of micro lenses, an array of focusing micro mirrors, an array of micro apertures or an array of any other element capable of providing the desired focusing effect. Depending on the type of focusing elements 20 that is used, the resulting holographic representation has to be viewed from the appropriate side of the substrate sheet 50, (i.e. in the embodiment with focusing micro mirrors, the holographic representation has to be viewed from the "opposed" side) as is clear from FIGS. 1 to 3b. Moreover as mentioned above, the focal distance of the focusing elements 20 is substantially equal to the thickness of the substrate sheet 50.

By arranging the registration-array of focusing elements 20 and the registration-array of reference objects 30 to provide a moiré-type holographic representation 10 of the reference objects 30, any relative misalignment between the arrays will be magnified in the holographic representation 10. In order to achieve improved readability and even further enhance the accuracy, the registration-array of reference objects 30 comprises one or more pairs of adjacent complementary sub arrays of reference objects 30A and 30B, respectively. The term adjacent complementary sub arrays of reference objects 30A and 30B refers to arrays of reference objects that, given a registration-array of focusing elements, gives rise to deviating holographic representation effects of the reference objects 30A and 30B in response to a misalignment shift in one or more translational or rotational directions, whereby the misalignment becomes simpler to detect. Such deviating holographic representation effects is e.g. achieved when the complementary sub arrays of reference objects 30A and 30B have different periods of repetition in at least one direction.

According to one embodiment, the registration-array of focusing elements 20 has a period of repetition of $P_{La}$ in a first direction a, the first sub array of reference objects 30A has a period of repetition of $P_{La}+\Delta$ and the second sub array of reference objects 30B has a period of repetition of $P_{La}-\Delta$ in the a direction. In order to further facilitate the readability etc, the interface between the first and second sub arrays of reference objects 30A and 30B essentially extends in the a direction.

FIGS. 5a to 5d schematically show one example of a registration structure 70, with a registration-array of focusing elements 20 in the form of micro lenses or the like with a period of repetition of $P_{La}$ in a first direction a. A first sub array of bar shaped reference objects 30A has a period of repetition of $P_{La}+\Delta$, which results in a holographic representation 10A and the second sub array of reference objects 30B has a period of repetition of $P_{La}-\Delta$ in the a direction which results in a holographic representation 10B.

Based on equation (1) it can be concluded that holographic representation of the first sub array of reference objects 30A with a period of repetition of $P_{La}+\Delta$ will be magnified by −m, whereas the second sub array 30B will be magnified by +m. Hence the degree of magnification for the two sub arrays of reference objects 30A and 30B is equal, but the holographic representation of the first sub array 30A will be inverted. Therefore, a misalignment shift of $(x_0, y_0, \alpha_0)$ will lead to a shift of $(-mx_0, -my_0, -m\alpha_c)$ for the holographic representation of the first sub array 30A and a shift of $(mx_0, my_0, m\alpha_0)$ for the holographic representation of the second sub array 30B. In other words, the dynamics in the holographic representations of the two sub arrays 30A and 30B will always be inverted or opposed.

Figure 5A:
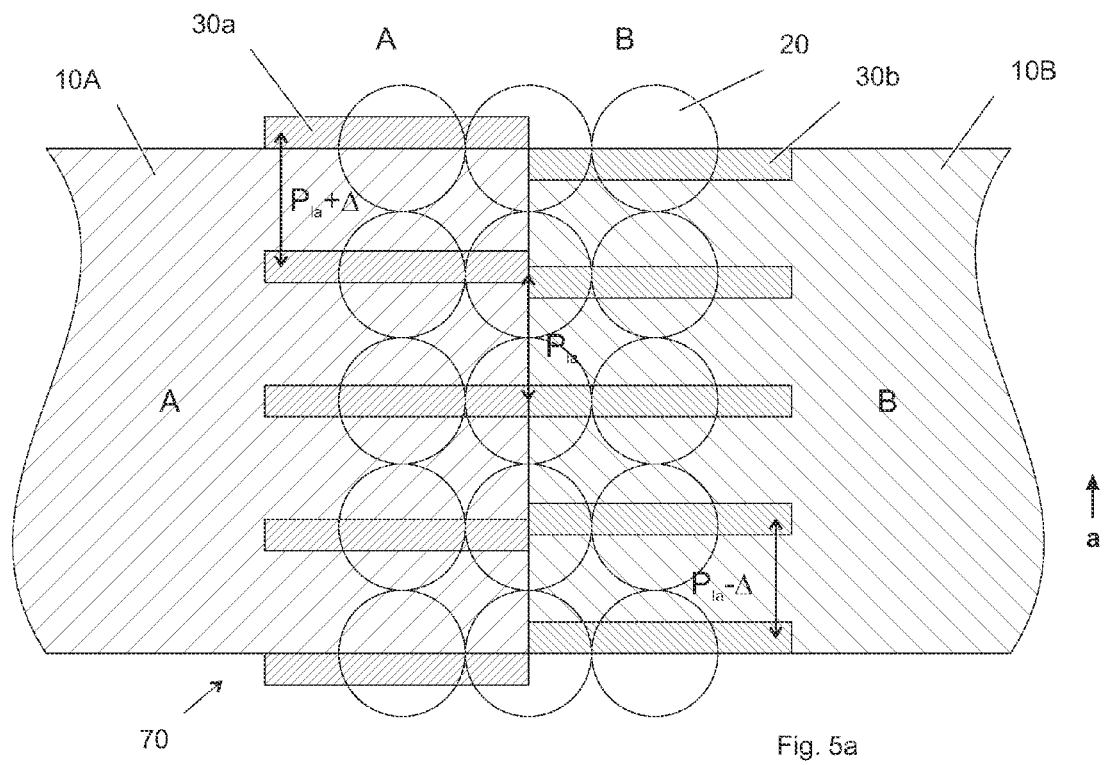
Figure 5B:
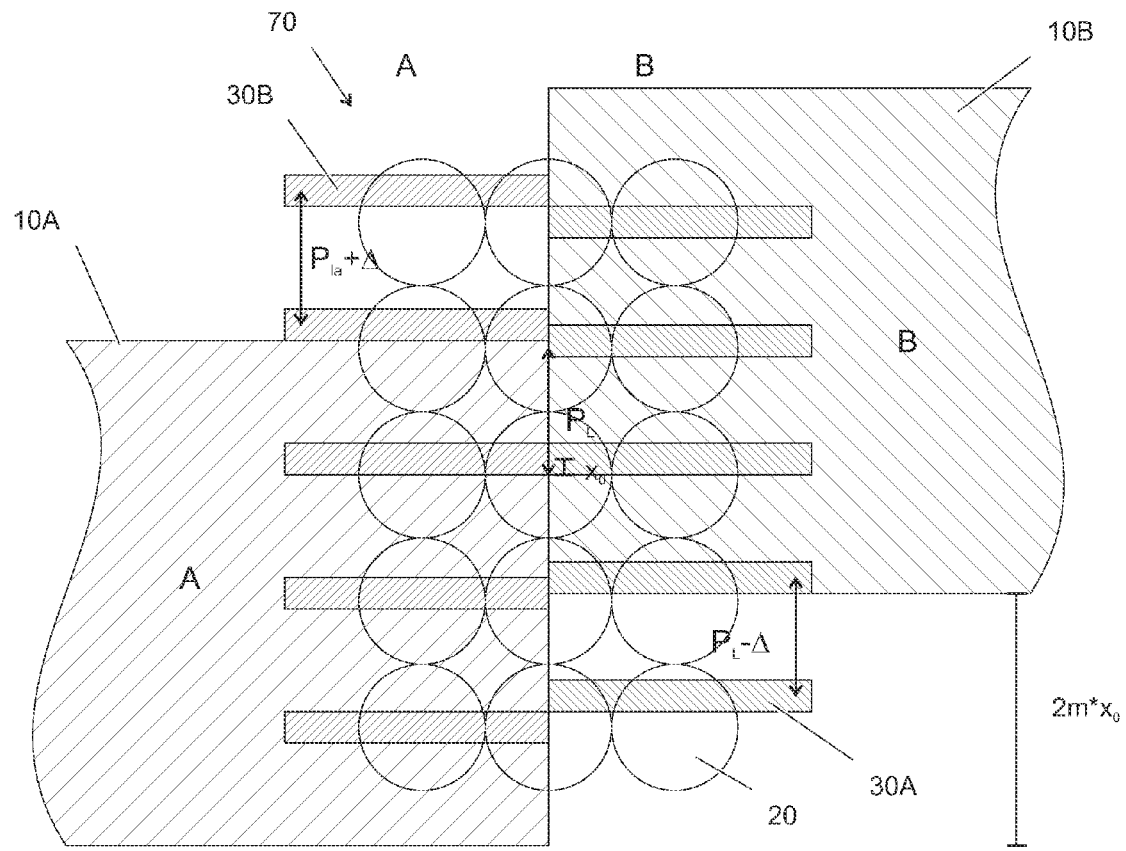

FIG. 5b schematically shows the registration structure according to FIG. 5a, wherein the registration arrays of focusing elements 20 and reference objects 30, respectively, are misaligned a small distance $x_0$ in the direction a. As can be seen, the resulting shift of the holographic representations 10A and 10B of the two sub arrays 30A and 30B is $m*x_0$. FIG. 5c is a similar schematic illustration, wherein the registration arrays of focusing elements 20 and reference objects 30, respectively, are misaligned by a small rotation $a_0$ which results in a relative rotation of the holographic representations 10A and 10B by $m*\alpha_0$. Following the expressions (1) and (2) a rotation $\alpha_0$ gives a rotation $\beta$ of the holographic representations 10A of the sub arrays 30A whereas the inverted holographic representations 10B of the sub arrays 30B is rotated by −$\beta$ which significantly improves the readability of rotational misalignments. FIG. 5d shows a schematic cross-sectional view of the registration structure 70 of FIG. 5a with primary product features 80 aligned with the registration-array of focusing elements 20 at the first surface of the substrate sheet 50, and secondary product features 90 aligned with the registration-array of reference objects 30 at the opposed surface of the substrate sheet 50. The section of the substrate with the primary and secondary product features 80 and 90 form a product 100 that is produced using alignment with the registration structure. As is disclosed in the above examples, the reference objects 30 of the first and second sub array may be of a shape, e.g. bar shaped, that gives a direct indication of a state of misalignment. By making the reference objects symmetric in the a direction, perfect alignment is easy to identify.

According to one embodiment, as is shown in FIGS. 5a to 5d the reference objects 30 of the first and second sub array are of bar shape arranged with the longitudinal direction transverse to the a direction. In order to register the alignment in all directions in the plane, the registration-array of reference objects 30 may comprise two or more pairs of complementary sub arrays of reference objects 30A and 30B, as is shown in FIGS. 6 to 8, the first pair may be arranged to display misalignment in a first direction, e.g. the x direction, and the second pair may be arranged to display misalignment in a second direction, e.g. the y direction, different from the first.

According to one embodiment, the second direction is transverse to the first direction and if the first and second directions are orthogonal, the reading of the alignment in each direction is independent of the other.

Figure 6A:
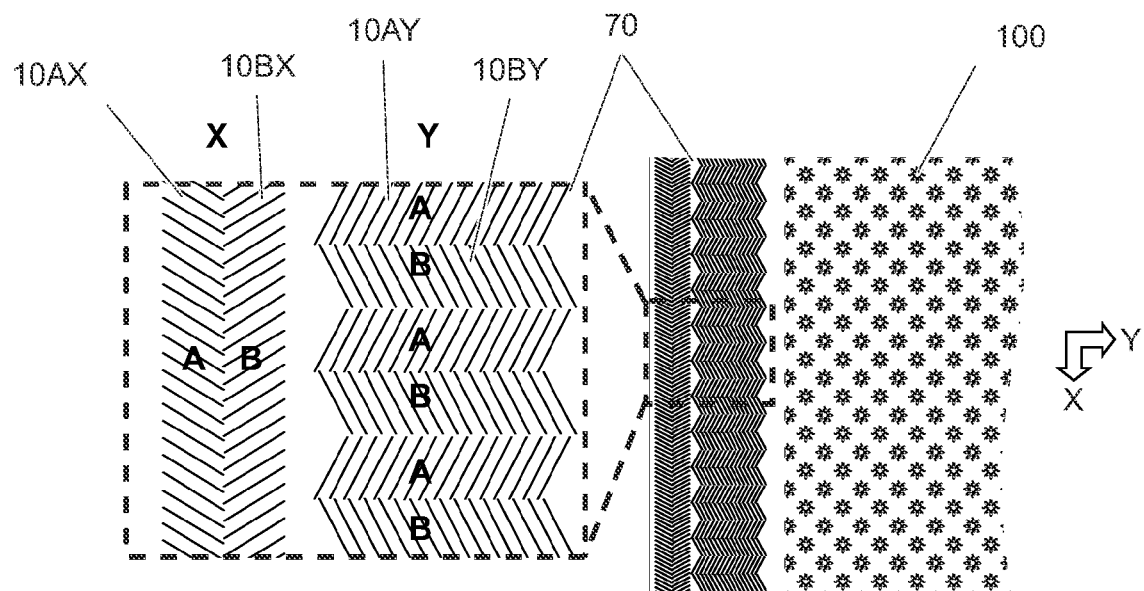
FIGS. 6a to 6c show one schematic embodiment of a registration structure comprising complementary sub-arrays of reference objects.
Figure 6B:
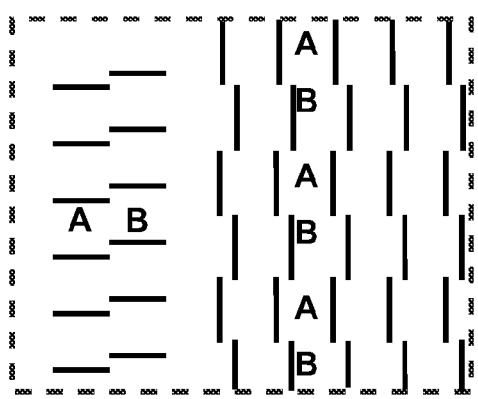
Figure 6C:
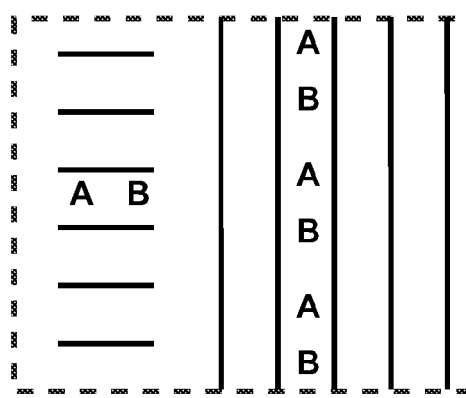

FIGS. 6a to 6c show one schematic embodiment of a registration structure 70 comprising a first pair of complementary sub arrays of reference objects with holographic representations 10AX and 10BX, respectively, and a second pair of complementary sub arrays of reference objects with holographic representations 10AY and 10BY, respectively. The holographic representations 10AX and 10BX gives a direct and intuitive indication of the alignment in the X direction, and 10AY and 10BY in the Y direction. FIG. 6a illustrates the resulting registration in response to a rotational misalignment whereby both pairs of complementary registration objects, 10AX-10BX and 10AY-10BY, are rotated with respect to each other to form a v shape. FIG. 6b illustrates the resulting registration in response to a pure translational misalignment in both X and Y directions whereby both pairs of complementary registration objects, 10AX-10BX and 10AY-10BY, are translated with respect to each other. FIG. 6c illustrates the resulting registration in response to a properly aligned situation whereby both pairs of complementary registration objects, 10AX-10BX and 10AY-10BY, are aligned with respect to each other.

As mentioned above, there are products with more than two sets of secondary product features 90 on the opposed surface of the substrate sheet, and in such cases, there may be provided one or more additional registration-arrays of reference objects 30 at the opposed surface of the transparent section of the substrate sheet 50, each being aligned with associated additional product features (not shown in figures) at the opposed surface the substrate sheet 50. The additional registration-arrays of reference objects 30 may be provided superimposed onto or adjacent to the preceding registration arrays.

According to one embodiment, the holographic registration structure 70 is arranged for a continuous production process with a feeding direction, e.g. X, and an alignment process of direct feedback type, wherein the registration structure 70 is repeated essentially continuously in the feeding direction. According to one embodiment, the registration structure 70 is provided as a semi continuous registration structure 70 that is formed along the substantial length of the substrate sheet 50, e.g. along one or both longitudinal edges, or at intermediate locations. As is disclosed in FIGS. 7a to 8c a first pair of complementary sub arrays of reference objects is arranged to display misalignment transverse to the feeding direction, and the repeating registration structure is formed so that the reference objects in said first pair are distinguishable from each other in the feeding direction. There may also be a second pair of complementary sub arrays of reference objects that is arranged to display misalignment in the feeding direction.

Figure 7A:
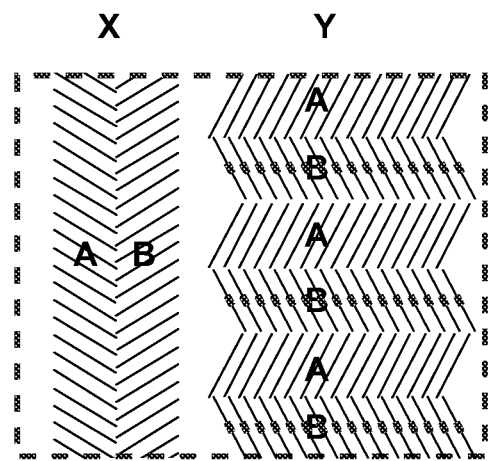
FIGS. 7a to 7c show one schematic embodiment of a registration structure comprising a complementary sub-array of reference objects in provided with a distinguishable mark.
Figure 7B:
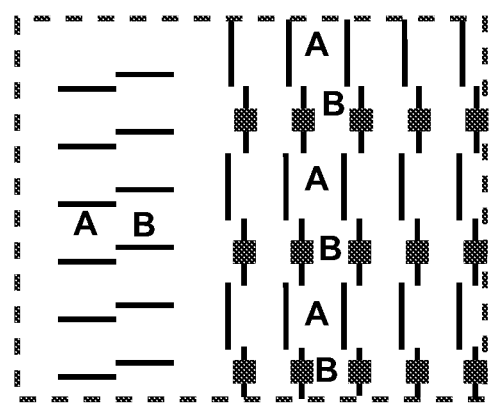
Figure 7C:
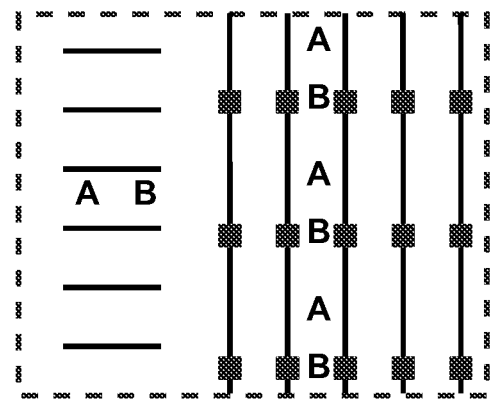
Figure 8A:
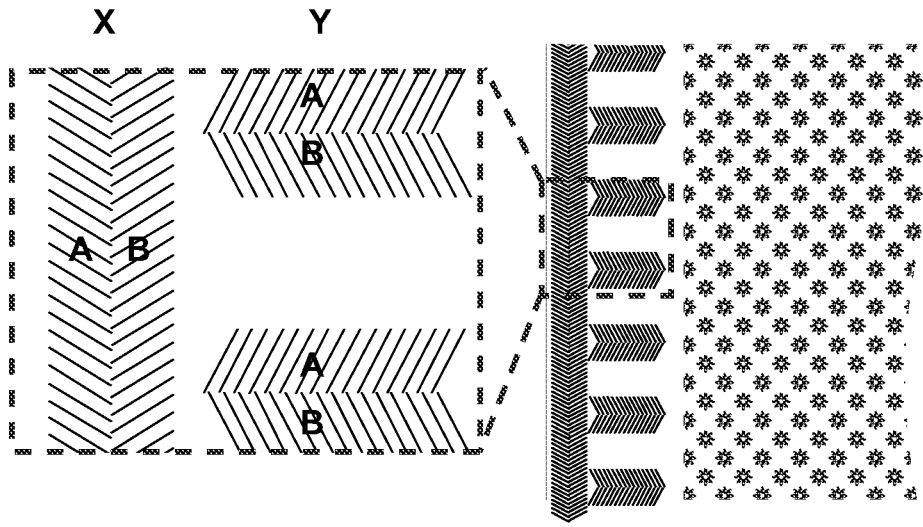
FIGS. 8a to 8c show one schematic embodiment of a registration structure comprising an intermediate space between adjacent pairs of complementary sub-arrays of reference objects.
Figure 8B:
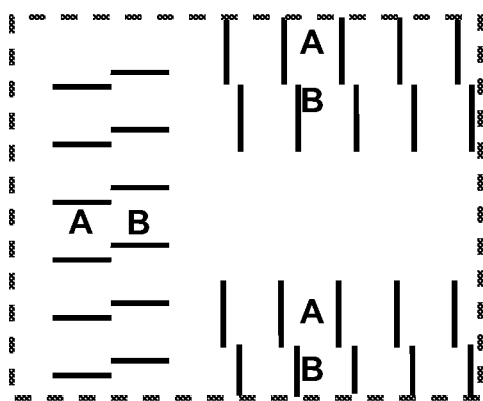
Figure 8C:
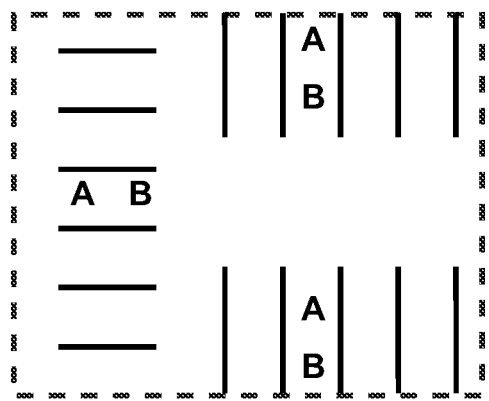

In order to make the of reference object arranged to display misalignment transverse to the feeding direction distinguishable from each other in the feeding direction, the sub array of reference object B in FIGS. 7a to 7c are provided with a distinguishable mark in the form of a square. According to another embodiment, disclosed in FIGS. 8a to 8c the reference object arranged to display misalignment transverse to the feeding direction is distinguished by the provision of an intermediate space between adjacent pairs. In yet another embodiment adjacent pairs, or groups of, reference objects are separated by lines. Such lines can be formed by arranging image objects that generate the lines in between the pairs or groups.

Figure 9A:
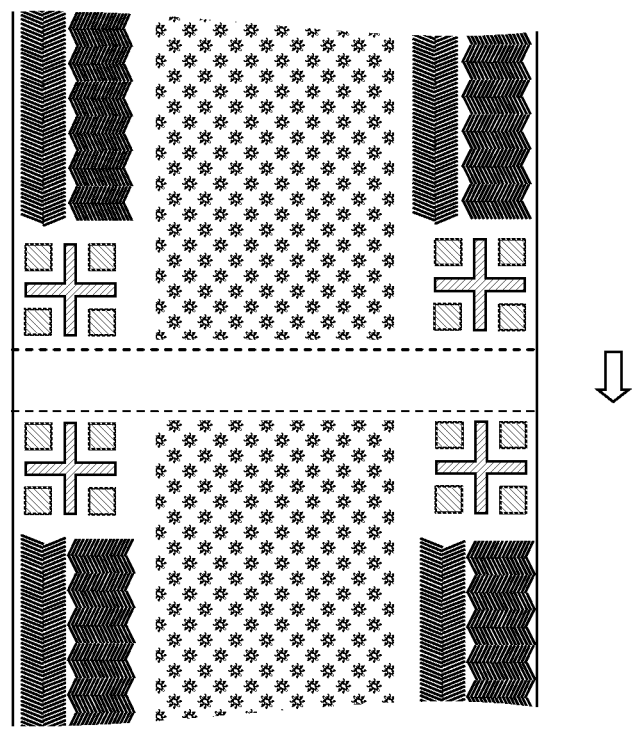
FIGS. 9a and 9b show one schematic embodiment of a macro registration structure.
Figure 9B:
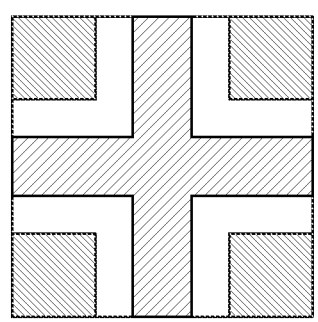

Due to the periodic nature of the registration structure 70, it is not possible to use the registration structure for macro scale registration or alignment. Therefore, as is schematically disclosed in FIGS. 9a and 9b, a macro registration structure may be provided to ensure macro alignment before the registration structure 70 is employed for high precision alignment. From FIGS. 1 and 2 of above, it can be concluded that a pure shift along an axis of repetition in the structure leads to a periodic repetition of the holographic representation each shift of $P_L/2$. Therefore, the macro registration structure 110 should be designed to provide an alignment accuracy that is less than $P_L/2$.

According to one embodiment, essentially the whole first surface is provided with an array of focusing elements with the registration-array of focusing elements integrated as one or more sections of the large array. According to one embodiment, the substrate sheet is provided with an array of focusing elements on one side thereof in a separate process, e.g. when producing the sheet, and the registration structure is used to align product features on the opposite side thereof.

According to one embodiment of the present invention there is provided a two-sided microstructured product comprising primary product features provided at a first surface of a substrate sheet, secondary product features provided at the opposed surface of the substrate sheet in alignment with the primary product features, and a holographic registration structure according to above. By way of example the holographic registration structure can be used to provide information about the accuracy of the alignment of primary and secondary product features in order to give feedback in a process of manufacturing the two-sided microstructured product or in order to acquire said information for other purposes such as quality control.

According to one embodiment of the present invention there is provided a two-sided microstructured product comprising primary product features provided at a first surface of a first foil, secondary product features provided at an opposed surface of a second foil adapted to be in alignment with the primary product features, and a holographic registration structure according to above. In use of the product the holographic registration structure can be used to align the primary and secondary product features to each other.

Said two-sided microstructured product may be a synthetic image device, holographic device, a brightness enhancement device, a retroreflective device, an electronic circuit device, a microfluidic device, a display device, a combination thereof, or an intermediate product in a production process.

According to one embodiment, there is provided a registration structure with a period of repetition of focusing elements 20 of $P_{La}=67.00$ μm, first sub array of reference objects 30A with a period of repetition of $P_{La}+\Delta=68.34$ μm, and second array of reference objects 30B with a period of repetition of $P_{La}-\Delta=65.66$ μm. In accordance with equation (1) the magnification for this example then is m=50 times. Assuming an image field of 10×10 mm² and that the width of the reference objects 30A and 30B is approximately 10 μm, then about 3 bar shaped holographic representations 10A and 10B of reference objects 30A and 30B, respectively, are provided in the image field. A shift of 1 μm between the registration-array of reference objects 30A and 30B with respect to the registration-array of focusing elements 20 results in a shift of the holographic representations 10A and 10B by 50 μm. Assuming a camera pixel size of 10×10 μm² the shift of 50 μm corresponds to camera pixels which represents a clearly detectable shift and a theoretical resolution of 0.2 μm in the specific case. This example gives one example of the enhancement in registration accuracy that can be obtained by the present registration structure, and as is evident from the general disclosure above the registration is very versatile and the desired accuracy can be adapted. To further illustrate this a Δ of less than 0.1 μm is feasible, and since the resolution is linearly scaling with the dimensions a registration resolution of a few nm is feasible.

FIG. 10 schematically shows one embodiment of a method of producing a two-sided microstructured product comprising the steps (FIG. 1) of:

800 providing primary product features at a first surface of a substrate sheet,
810 providing secondary product features at the opposed surface of the substrate sheet,
820 registering the mutual alignment of the primary and secondary product features to estimate alignment parameters, and
830 aligning the provision of primary and secondary product features by controlling at least one step of providing product features by feedback of alignment parameters.

According to one embodiment of a method in accordance with the present invention the steps of providing primary product features 80 and providing secondary product features 90 comprises the steps of repeatedly providing a set of primary product features 80 and a set of secondary product features 90 in a continuous process along the substrate sheet 50.

Figure 11A:
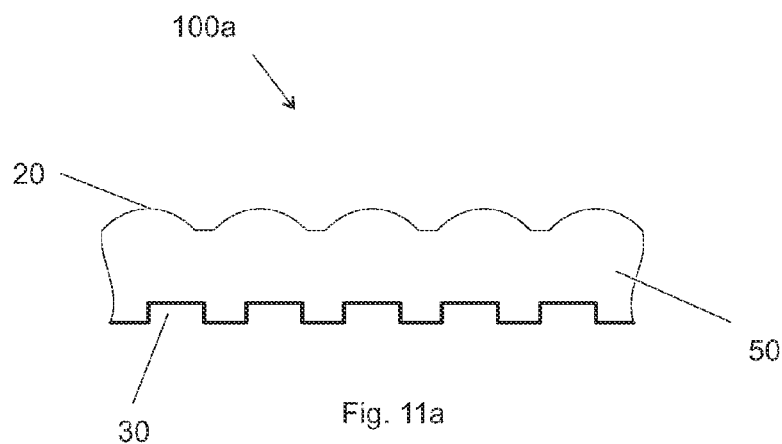
FIGS. 11a and 11b show schematic examples of two-sided microstructured products in accordance with the invention.
Figure 11B:
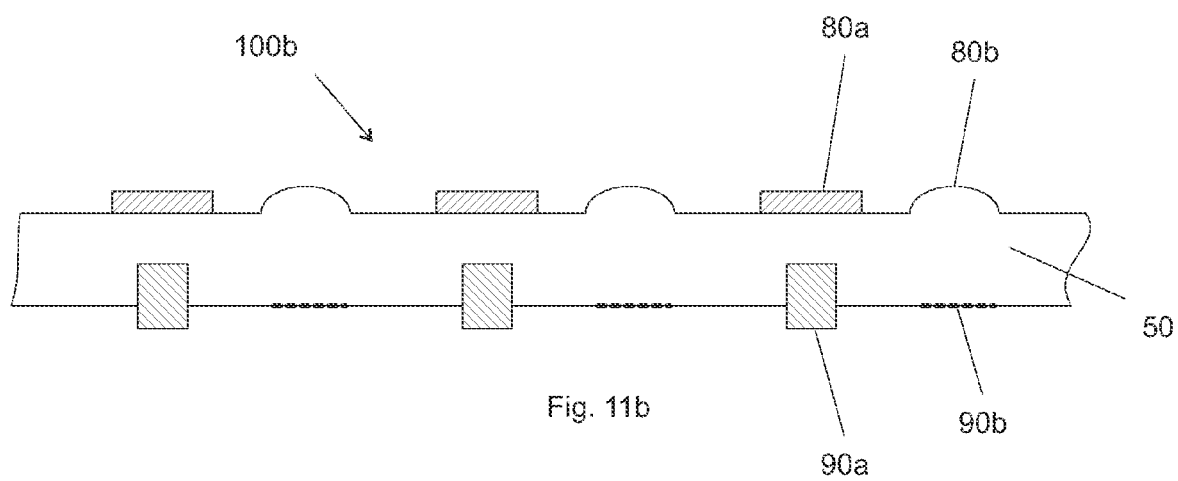

Throughout this application, the term microstructured products refer to products with functional micro scale product features. The microstructured product features may be either or dimensional features, and may be provided by a number of techniques listed below. A two sided product is defined as a product wherein at least one product feature at a first side of a substrate sheet is arranged to interact with at least one product feature at the second surface of the substrate sheet, and that the interaction is dependent on the relative alignment of the said product features in three dimensions. Schematic examples of two-sided microstructured products 100a and 100b are disclosed in FIGS. 11a and 11b. Said products 100a and 100b comprises primary product features 80 on a first side of the substrate 50 and secondary product features 90 on a second side thereof. FIG. 11a shows a holographic device 100a of moiré type with primary product features in the form of micro lenses 80 and secondary product features in the form of embossed features 90. FIG. 11b shows a combination device with two sets of aligned primary product features 80a and 80b and two sets of aligned secondary product features 90a and 90b. The product features in FIG. 11b may be provided by any techniques disclosed herein and arranged to provide desired interaction effects.

The substrate sheet 50 may comprise any sheet material. In production the substrate sheet is also referred to as a web. The substrate sheet may be substantially transparent, translucent, or opaque, but in order to achieve alignment of product features on both sides thereof, substrates with reduced transparency may comprise one or more substantially transparent sections dedicated for an optical registration step. The substrate sheet may comprise paper, filmic material or metal, such as aluminum. The substrate sheet may be in the form of one or more sheets/foils or a web. The substrate sheet may be cast, calendared, blown, extruded and/or biaxially extruded. The substrate sheet may comprise polymeric compounds. The substrate sheet may comprise any one or more selected from the group comprising polythyleneterephthalate, polymetylenemetacrylate, polypropylene propafilm, polyvinylchloride, rigid pvc, cellulose, tri-acetate, acetate polystyrene, polyethylene, nylon, acrylic and polytherimide board. The substrate sheet may comprise papers made from wood pulp or cotton or synthetic wood free fibres. The paper may be coated, calendared or machine glazed.

The steps of providing product features 800 and 810 may be performed by a large number of different techniques and process types such as, different types of printing, embossing, continuous casting, surface coating, laminating, or combinations thereof. Examples of printing techniques comprise screen printing, offset printing, flexo printing, ink-jet printing and the like According to one embodiment, the one or more of the steps of providing product features 800 and 810 at the substrate sheet may comprise depositing a curable compound on at least a portion of the substrate sheet. The curable compound may be deposited by means of gravure or flexographic printing or any other technique that is suitable. The curable compound may be cured by electromagnetic radiation such as ultraviolet (UV) light or an electron beam, heat radiation or the like.

According to one embodiment, one or more of the steps of providing product features 800 and 810 are performed by a rolling process, such as a roll embossing or printing process wherein a negative pattern is provided on a roll and the pattern is transferred to the substrate sheet by a rolling process. The pattern may be embossed directly into the surface of the substrate sheet or into a compound layer provided on the surface of the substrate sheet, as discussed above.

Further as is discussed above, the product 100 may be any product with two or more sets of microstructured product features 80 and 90 that need to be aligned. According to one embodiment the steps of providing secondary product features 810, registering the mutual alignment of the primary and secondary product features 820, and aligning the primary and secondary product features 830, are repeated one or more times to provide a product 100 with two or more secondary product features, each being aligned with the primary product features. It should be noted that, the steps of providing primary product features 800 and providing secondary product features 810 do not have to be performed in the specified order, whereby either one of the product features may be provided first. However, in the case when the product comprises one or more additional product features that are provided in separate steps, the primary product features 80 must first be present in order to enable the step of aligning the additional product features 90. The step of alignment 830 may be performed integrally with the second (or subsequent) step of providing product features.

According to one embodiment, the step of registering 820 the mutual alignment of the primary and secondary product features involves identification of the relative positions of primary and secondary product features 860. The identification may be based on various detection techniques as well as optical inspection and image analysis and combinations thereof. In one embodiment, the primary and secondary product features are formed to interact to produce an optical effect such as holographic representation or the like. A holographic representation of moiré type gives direct information about misalignment of the two sets of product features. As is disclosed in FIG. 4a a misalignment in the translation or transverse direction results in a magnified displacement of the holographic representation from the desired position, whereas an angular misalignment, FIG. 4b, results in reduced magnification of the holographic representation together with a magnified angular misalignment of the representation from the desired position. Such deviations, displacement and angular, may be recognised by an image analysis system that continuously registers and compares subsequent holographic representations to detect any deviations and estimates alignment parameters. According to one embodiment there is provided one or more non-holographic reference symbols with a predetermined position and size that may be used as reference objects to detect deviations in the holographic representation of the product features.

According to one embodiment, the step of registering the mutual alignment of the primary and secondary product features, involves identification of the relative positions of primary and secondary registration features of a registration structure 890, wherein the primary registration features are provided 870 in alignment with the primary product features at the first surface of the substrate sheet and the secondary registration features are provided 880 in alignment with the secondary product features at the opposed surface of the substrate sheet. Such primary and secondary registration features may be designed in many ways and being adapted for registration in many ways to provide a registration resolution of less than 50 µm, 20 µm, 10 µm, 5 µm, preferably less than 2 µm, more preferably less than 1 µm, still more preferably less than 0.5 µm and most preferably less than 0.2 µm. As mentioned above the registration resolution can be even further decreased to a few nm, however, as means for registering mutual alignment to give feedback of alignment in a production process the registration resolution is often limited for practical reasons. Nevertheless the feasibility of high registering resolution of less than 0.1 µm, preferably less than 0.01 µm can be used as means for registering mutual alignment to give feedback of alignment in a production process, but preferably for other purposes such as alignment of separate foils or quality control.

According to one embodiment of the present invention all focusing elements 20 at the first surface of the substrate sheet provides the same magnification and product features, registration features, reference objects, etc. are adapted thereto.

According to another embodiment of the present invention the focusing elements 20 have different magnification for the registration-array of reference objects and the array of secondary product features, respectively, whereby the magnification in the registration-array can be chosen to enable high resolution registering independently from the magnification in imaging of the product features.

According to one embodiment disclosed in great detail above, the primary registration features comprises a registration-array of focusing elements 20, and the secondary registration features comprises a registration-array of reference objects 30. Further, the registration-array of focusing elements and the registration-array of reference objects are arranged to provide a moiré-type holographic representation of the reference objects, and wherein the registration-array of reference objects comprises one or more pairs of adjacent complementary sub arrays of reference objects. Such a registration may be designed to achieve highly intuitive registration while still provide a very good registration resolution. The registering of a holographic representation of the holographic registration structure may be performed visually by an operator who identifies and estimates if the alignment has to be adjusted. But in order to avoid subjective registration and to enable higher production rates, the registration may be performed by an optical registration unit, such as a laser scanner, a camera or the like. The steps of identifying the relative positions of the holographic representations, and estimating alignment parameters may then be performed by an image processing unit. In order to achieve high production rates, the reference objects in the pairs of complementary sub arrays should be designed to enable fast identification and estimation, as is discussed above with reference to FIGS. 5 to 8. Further, as discussed further in the following, Fourier analysis and dimensional reference objects can also be used.

According to one embodiment of the present invention, the images of the holographic representations registered by the image registration unit may be used to estimate the product quality based on the captured images. Such a quality evaluation is especially useful when the product is a moiré-type holographic device, as the holographic representation of the registration objects then also may be used to evaluate quality parameters not related to alignment of the product features, such as material properties of the substrate sheet, deviation from predetermined periodicity, substrate sheet tension, isolated errors, dust etc. For example, substrate sheet tension can be identified by monitoring the periodicity of the holographic representation of the registration objects in the translation direction and/or the transverse direction.

Like discussed above, the registration of the mutual alignment of the primary and secondary product features to estimate alignment parameters may be performed by various techniques, from manual optical inspection (eye) to analysis using different types of optical vision systems (any wavelength, monochromatic light, visible, IR, X-ray etc.), with or without pattern recognition for automation. Another example is optical signal measuring systems wherein registration structures can be designed so as to generate distinct signals telling when being in or out of registration and how much, instead of reading an image. Still another example is acoustic impedance measuring systems, wherein e.g. an ultra-sound wave (mechanical wave) of known shape is sent in the direction transverse of the foil substrate. Depending on the registration of the microstructures, the reflected or transmitted acoustic impedance will look different. Special alignment structures can be designed so as to generate a distinct peak in reflected or transmitted impedance at perfect registration. Similarly, magnetic or electric field impedance measuring systems can be used based on the same principles as mentioned for ultra sound above. A known field is put across the foil to be registered and the reflected or transmitted field is measured. Likewise, special alignment structures can be designed so as to generate a distinct peak in reflected or transmitted impedance at perfect registration. One example of alignment parameters is direct deviation parameters in the longitudinal and transverse direction together with an angular deviation parameter.

According to one embodiment of the present invention Fourier analysis is used in the step of registering mutual alignment of the primary and secondary product features. The Fourier analysis can for example be used in image analysis of the registration structure to isolate the information corresponding to the registration structure or to isolate information corresponding to any periodic features in order to track isolated errors. This is possible due to the periodicity of the registration-array of reference objects 30. A graphical representation of the data from the Fourier analysis will show peaks corresponding to registration structure and the lens period. Since the lens period is predetermined this can be controlled in order to obtain a rough alignment or to monitor changes of the lens period due to any adjustment in order to align the provision of primary and secondary product features.

Figure 12:
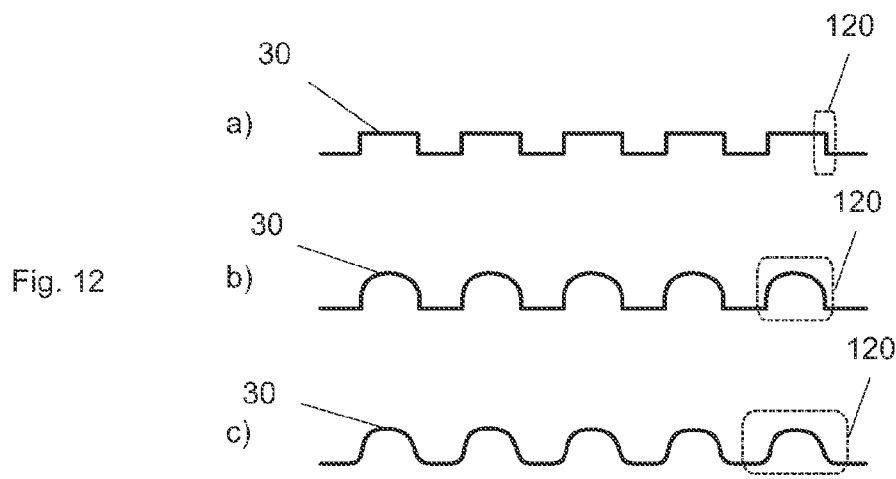
FIGS. 12a to 12c schematically illustrate different cross-sectional shapes of reference objects in accordance with the present invention.

As mentioned above the image objects need not to be extended in the "thickness" direction. However, dimensional reference objects can be used to improve the registration of the mutual alignment of the primary and secondary product features. FIGS. 12*a* to 12*c* schematically illustrate cross sections of registration-arrays of reference objects 30. In Fig. Aa the reference objects have sharp edges and the imaging is based on Fresnel reflection/refraction in an critical region 120 wherein there is an abrupt step from one level to another. Referring to FIGS. 12b to 12c, by having reference objects 30 with a rounded shape, i.e. a dimensional shape, the critical region 120 can be extended and the accuracy in the registration can be improved. In particular the 3 dimensional shape of the reference objects 30 can be used together with Fourier analysis.

Hitherto the mutual alignment of primary and secondary product features involving registration of the holographic representation has been described for 2D alignment in the plane of the substrate sheet, hereinafter referred to as x,y-registering. Further, the mutual alignment of the primary and secondary product features in a direction normal to the surface of the substrate sheet, hereinafter referred to as z-registering, can be registered. Hence, the registering of the mutual alignment of the primary and secondary product features can be three dimensional. As mentioned when describing the principles of holographic representation above the distance between the focusing element and the image object determines to which extent the image object is represented. If the distance is too large, e.g. the substrate sheet is too thick, the image object may be inverted in a holographic representation and on the other hand if the distance is too small there will be overlapping information represented as illustrated in FIG. 2b. This may give a blurred holographic representation of product features or registration features, which can be used to estimate alignment parameters regarding the alignment in the direction normal to the surface of the substrate sheet and aligning the provision of primary and secondary product features by controlling at least one step of providing product features by feedback of these alignment parameters. Accordingly, the z-registering can be used for thickness control.

According to one embodiment of the present invention a registration structure comprises a dimensional reference object 30 wherein the surface is divided into a plurality of levels. Preferably the image objects are extended in a direction normal to the surface of the substrate sheet, i.e. the "thickness direction", in order to allow for identification of a change of level in the image object. More preferably the image objects are "low", i.e. the change of level is small in order to enable accurate registration of change from one level to another.

Registering of the alignment in the direction normal to the surface of the substrate sheet can be based on various detection techniques such as optical inspection and image analysis.

Deviations from a predetermined distance between primary and secondary product features may be recognised by an image analysis system that continuously registers and compares subsequent holographic representations to detect any deviations and estimates alignment parameters. Such a registration may be based on intuitive registration of a holographic representation of product features or reference objects, or based on image processing of images collected by an image processing unit from reference objects designed to enable fast identification and estimation, as is discussed above.

According to one embodiment the registering of the mutual alignment of primary and secondary product features to estimate alignment parameters in accordance with the method of the invention comprises registering of alignment in dimensions. For a continuous process this means that the registering of alignment preferably is made in the translation direction and/or the transverse direction and the thickness direction of the substrate sheet.

Figure 13:
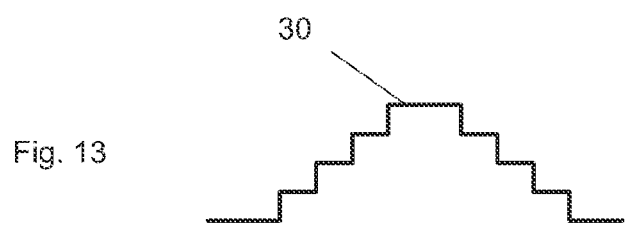
FIG. 13 schematically illustrates a stepped reference object in accordance with the present invention.

According to one embodiment of the present invention the registration structure comprises arrays of reference objects having a period of repetition, $P_O$, arranged to be viewed through an associated array of micro lenses having a period of repetition, $P_L$, as synthetic three-dimensional integral images. In this embodiment the reference objects have a dimensional shape with a plurality of plateaus defining different levels of the reference object. FIG. 13 schematically illustrates a cross sectional view of a stepped reference object 30 that provides a plurality levels that can be used e.g. for thickness control. As explained above, an imaged object is sharply represented if the difference $P_L$-$P_O$ is substantially equal to the width of an imaged section at a predetermined distance from the micro lenses. Since the width varies with the distance from the micro lenses the perceived image is blurred. Consequently the sharpness of the representation of different levels will differ and hence by identifying the level that is sharply represented the thickness of the substrate sheet can be determined. Although this embodiment has been described in terms of reference objects it should be appreciated that this multilevel z-registering can be made using 3 dimensional product features or registration features in the same way as reference objects.

Figure 14:
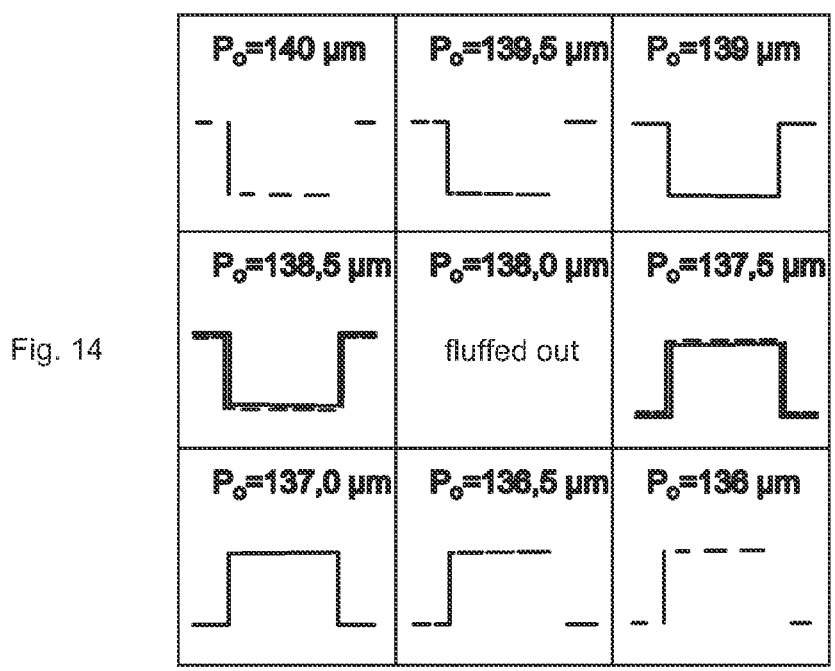
FIG. 14 schematically illustrates one embodiment that can be used for determination of thickness in accordance with the present invention.

FIG. 14 schematically illustrates a registration structure that comprises sections of registration-arrays of focusing elements 20 and associated registration-array of reference objects 30. The sections have reference objects 30 with different period of repetition, $P_O$, between two successive reference objects 30, preferably varying about a nominal period of repetition, $P_{O,nom}$. Preferably the period of repetition, $P_L$, between two successive focusing elements 20 is the same in all sections. By way of example FIG. 14 illustrates the images perceived in nine sections having a period of repetition between two successive reference objects 30 of $P_{O,nom} \pm n*\delta$, wherein $P_{O,nom}$ is 138 µm and is 0.5 µm. In this example $P_L$ is 138 µm. As is illustrated, two of the sections corresponding to a $P_O$ of 137 and 139 µm, respectively, are sharply represented although for $P_O$=139 µm the perceived image is inverted. For a $P_O$ of 137.5 µm and 138.5 µm the holographic representation comprises overlapping information and for a $P_O$ exceeding 139 µm or below 137 µm the holographic representation lacks information. For $P_O$=$P_L$ the holographic representation is fluffed out. It should be appreciated that in an alternative embodiment $P_O$ is constant and $P_L$ is varied.

In one embodiment a registration-array of micro-lenses at a first side of the surface of the substrate sheet that is associated with a registration-array of reference objects at the opposed side of the substrate sheet comprises sections of micro-lenses with different focal lengths. This can be used to register the mutual alignment in a direction normal to the surface of the substrate sheet to estimate alignment parameter According to one embodiment of the present invention the lenses for providing a holographic representation that is used for registering the mutual alignment of primary and secondary product features are ideal, i.e. there is substantially no aberration, in order to improve the registration resolution. When using a non-ideal lens suffering e.g. from spherical aberration the actual focal point of a lens generally does not appear at a flat surface for differing angles of view, and accordingly the imaged reference object becomes somewhat unsharp, as viewed through the lens. If the image is used to register the alignment of primary and secondary product features in the "thickness" direction of the substrate sheet by using reference objects that are extended in the thickness direction it is difficult to determine exactly when the reference object is in "focus". Although ideal lenses may be used for registration lenses having different kind of aberrations may be used for other purposes.

The step of registering the mutual alignment of the primary and secondary product features 820 may be performed subsequent the steps of providing said first and secondary product features 800 and 810, whereby the estimated alignment parameters are used for controlling the at least one step of providing product features 830. The degree of feedback delay that is achieved is dependent on the distance between the last step of providing product features 820 and the position at which the registration is performed. In order to reduce the feedback delay the step of registering the mutual alignment of the primary and secondary product features 820 is, according to one embodiment, performed simultaneous with a step of providing said first or secondary product features 800 or 810. For some techniques of providing product features it is then actually possible to perform minor corrections of the alignment 830 by direct feedback of alignment parameters from the simultaneous registration before the product features are finalized.

According to one embodiment, the last step of providing product features 800 or 810 is performed by a continuous casting process comprising the steps of applying a UV-curing lacquer on the substrate surface, generating product features by embossing the lacquer, and curing the UV-curing lacquer by means of a UV-light source. In this embodiment it is possible to register the mutual alignment of the primary and secondary product features 820 during the step of embossing the lacquer and to give feedback about registration to align the primary and secondary product features 830 just before curing. This method can be used to pick up and adjust for stochastic and short frequent miss-registrations. The first provided (primary or secondary) product features structures may be focusing elements e.g. microlenses, that can be used to create a registration structure or an image in combination with the subsequently provided product features. The generated registration structure or image can then be used to measure or judge the quality of the registration. If the registration is good one does not control the alignment and simply let the product features cure. If the registration is unsatisfactory the alignment parameters are used to control the alignment and thereafter cure the second pattern.

Depending on the types of processes employed for the provision of the product features, the steps of providing primary product features 800 and providing a registration-array of focusing elements 870 may performed as one single step, whereby the alignment between said product features and the registration array will be constant over time. Similarly, the steps of providing secondary product features 810 and providing a registration-array of reference objects 880 may be performed as one single step.

Due to the extremely small tolerances involved in the production processes, and that the process involves repetition of the steps, small deviations in the means for providing the production features or the like will be repeated over time to produce repeating misalignment patterns and/or drift in registration. According to one embodiment, there are provided steps of:
  910 identifying and analyzing performed alignments over time to find repeating misalignment patterns and/or drift in registration, and
  920 performing preventive control of the second step of providing product features in response to identified repeating misalignment patterns and/or drift in registration.

Such repeating misalignment patterns may be identified for one or more repetition sequences, e.g. a predetermined number of rotations of an embossing roll or the like, to produce a "map" of repeating misalignment patterns. The map is thereafter used to perform the preventive control, while stochastic misalignments or faults are compensated for in a direct feedback manner. In order to identify drift in registration, alignment parameters are analyzed over time to find drifts due to, wear, mechanical deformation or the like According to one embodiment, the substrate sheet is a substrate web that is fed through the continuous process in a reel to reel process. As mentioned above, the steps of providing product features and registration-arrays in such a process may be based on different types rolling techniques which allow a high web feed rate. In order to control the second step of providing product features in a continuous process of reel to reel type or the like, the step of controlling the at least one step of providing product features by feedback of alignment parameters may involve controlling one or more parameters in the process.

One embodiment comprises controlling the web tension in the translation direction and/or the transverse direction. The web may further be translated in the transverse direction. By changing the web tension, stretching or contracting the web, one can e.g. increase or decrease the periodicity of the first generated product features so that the second product features may be generated perfectly in register. One example is to control the alignment when there is a difference in periodicity in the web direction between the primary product features and the secondary product features. In other applications the dimension of product features may need to be matched. There are also other ways of affecting the dimensions in order to achieve controlled deformation of the web and registration of the generated patterns in both web and cross-web direction such as; changing temperature of the web.

According to one embodiment, one or more of the steps of providing product features is performed by a rolling process with at least one embossing roll, whereby the step of controlling the at least one step of providing product features may involve controlling one or more of the parameters: roll position, roll skew, roll dimensions and roll rotation speed, for at least one roll.

Individual rotation speed control on two subsequent embossing rolls can be used to catch up small alignment deviations in the substrate or web-direction. This may be used to compensate for a situation when one of the generated patterns of product features does not have the same dimension in the web direction, for example if the roll diameter is slightly different or if the pattern has been stretched in some other way.

Translation of the rolls can also be performed in order to adjust for alignment errors in both web-direction and cross web-direction.

If there is a scaling deviation between the two generated patterns of product features so that they do not have the same dimensions in web- or cross web-direction, it is possible to change those within a small range, e.g. by temperature control in order to thermally expand or contract one of the rolls and the pattern it carries. This will create a change in dimensions in both web- and cross web-direction, perhaps unwanted in one of the directions. However, using heat for adjusting to perfect registration in cross web-direction, one can for example use a different rotation speed on the roll to compensate the generated error in web-direction registration.

As mentioned above, in the method for producing a two-sided microstructured product the one or more of the steps of providing product features 800 and 810 at the substrate sheet may comprise depositing a curable compound on at least a portion of the substrate sheet. In this kind of process the step of controlling the at least one step of providing product features by feedback of alignment parameters may involve controlling one or more parameters that influence on the properties of the deposited curable compound, such as the thickness thereof. A change in the rotation speed of a roll in a roll to roll process may change the final thickness of the substrate sheet. The viscosity of the curable compound may also be used to control the thickness. As mentioned above also the temperature of one or more rolls can be used for control, and if using an applicator roll the pressure exerted on an embossing roll or the relative position can be controlled.

When controlling one in order to align the primary and secondary product features it should be noted that a change in e.g. rotation speed of a roll not only gives an adjustment of the periodicity of the primary and/or secondary features in the web direction but also may give a change in thickness of the web. Accordingly two or more parameters may have to be adjusted in order to accomplish a certain effect without having non-desirable side effects.

According to one embodiment, means for providing product features etc. involves fabrication of a master structure that in turn is used to provide an embossing plate that is attached to the surface of a roll in the disclosed arrangement. The master structure, or a mask for lithographic fabrication of a master structure on for example a glass substrate, may e.g. be fabricated using a laser writer with registration accuracy better than e.g. 0.5 µm per meter or another technique of suitable accuracy. The fabricated master structure comprising micro lenses and/or other microstructured features can be copied through electroplating. The generated negative copy or additional copies can for example be a thin plate made of Nickel. The plate can with different methods be attached to a roll and be used for replication through embossing. Using this technique one can transfer the relative accuracy in registration on a pattern from an ideal flat master to a circular production tool. Preferably the embossing plate is attached to the roll so that a first registration structure 70' in one end of the embossing plate is arranged at, and preferably kept in place, a predetermined distance from a last registration structure 70" in the other end of the embossing plate. Thereby drift in the position of the product features on the substrate sheet can be reduced. This is particularly important when two or more patterns are aligned to each other. Drift can be compensated for by successive adjustment of the rotation speed of the rolls. Preferably the accuracy of the alignment of the first registration structures 70' and the last registration structures 70" is less than 5 µm, more preferably less than 1 µm, in order to enable a registration accuracy of less than 1 µm.

Figure 15:
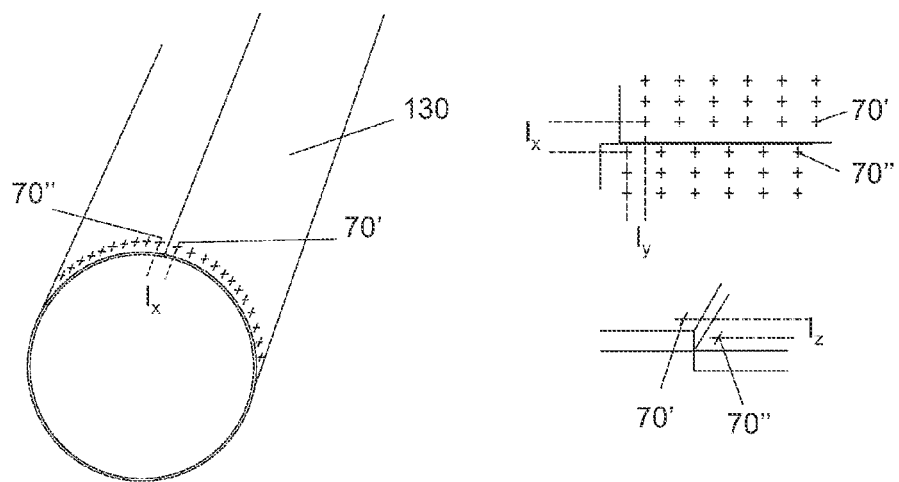
FIG. 15 schematically illustrates an embossing plate formed as a sleeve in accordance with the present invention.

According to one embodiment of the present invention the embossing plate is prior to attachment to the roll formed to a cylinder and the end portions are attached, e.g. by welding, to each other in order to form a sleeve 130 that is arranged on the roll. FIG. 15 illustrates a sleeve 130 comprising negative copies of the product features and/or the focusing elements 20 and/or reference objects 30 that are going to be embossed on the substrate sheet. This embodiment enables a narrow junction, preferably seamless, between the ends of the embossing plate and hence a high accuracy in the alignment of the first registration structures 70' and the last registration structures 70". Preferably the accuracy of the alignment accuracy in the tangential and transverse directions of the sleeve is less than 5 µm, more preferably less than 1 µm, respectively, in order to enable a registration accuracy of less than 1 µm. As is illustrated, the distance $l_x$ in the tangential direction and $l_y$ in the transverse direction can be adapted to give only a small deviation, or no deviation, from a periodic pattern when product features are embossed even though the junction have been passed.

In one embodiment the sleeve 130 has a smaller diameter than the roll. This enables a firm fitting of the sleeve 130 to the roll. Accordingly the basic shape of the sleeve 130, as well as other properties such as thermal properties, is provided by the roll. Since the diameter of the roll is smaller than the diameter of the roll the sleeve has to be stretched before it is arranged on the roll. This can generate a remaining tension of the sleeve that have an influence of the periodicity of embossed structures. This can be compensated for by e.g. adjusting the rotation speed of the roll and/or heating the roll, but if other rolls in the arrangement are provided with sleeves in the same way such an compensation may be redundant.

It is also possible to affect the dimensions on a magnetic embossing plate formed about the roll (ex. Nickel) by applying a large magnetic field of controlled direction. The applied magnetic field will orient the magnetic domains in the material parallel to the direction of the field and simultaneously the material will contract slightly in the same direction. The material will also expand in the direction transverse to the field. This effect is permanent and can be achieved before mounting the plate. The strength of the magnetic field determines how large this effect is.

The dimensions of an embossing plate can also be changed by mechanical stretching in either direction, thereby causing possibilities to register. The stretching can be performed with plastic deformation causing a permanent effect or by elastic deformation causing an effect that will last only as long as the plate is held in tension. After release, an elastically deformed plate will contract to its original dimensions.

Figure 16:
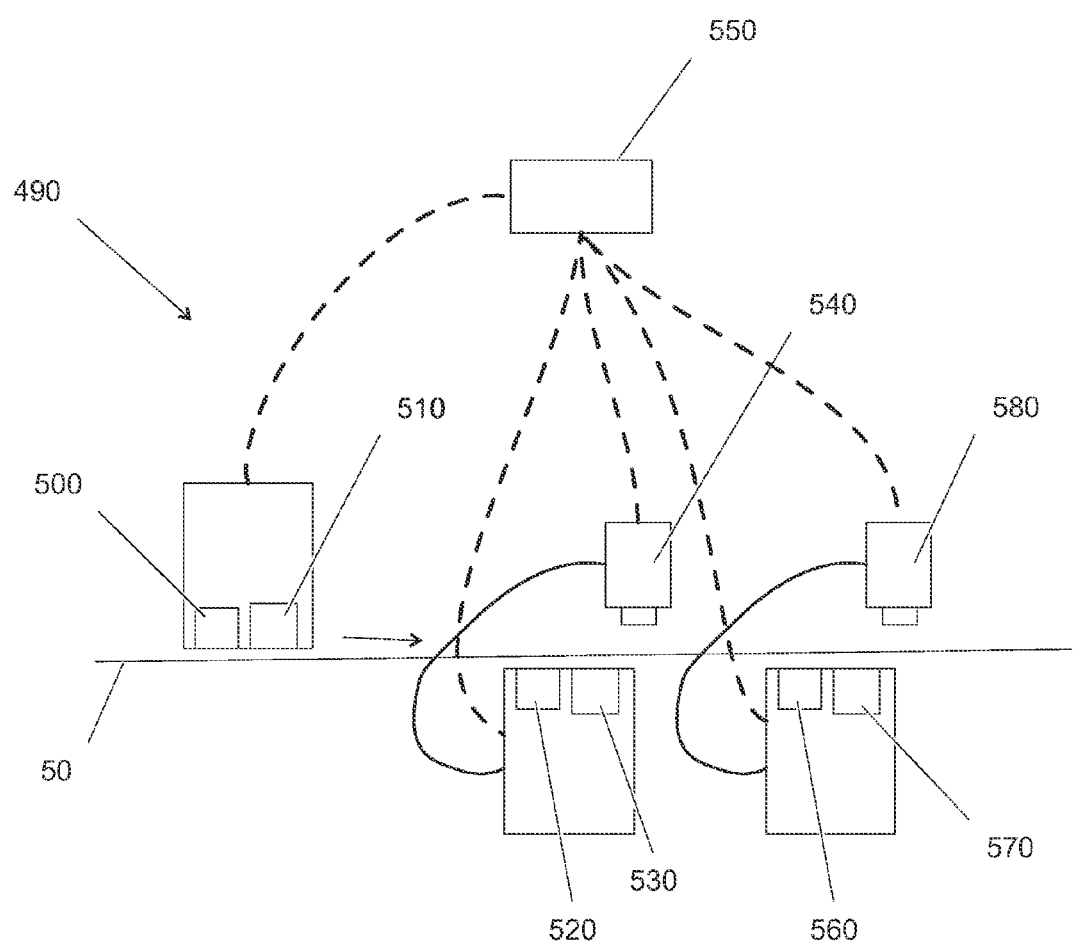
FIG. 16 shows a schematic arrangement for producing a product according to the present invention.

FIG. 16 schematically shows one embodiment of an arrangement 490 for producing a two-sided microstructured product in a continuous process along an elongated substrate sheet 50 comprising:

means 500 for providing primary product features at a first surface of the substrate sheet 50, means 520 for providing secondary product features at the opposed surface of the substrate sheet, registration detection system 540 arranged to register the mutual alignment of the primary and secondary product features and to estimate alignment parameters, and an alignment control system 550 arranged to align the provision of primary and secondary product features by controlling at least one of the means for providing product features by feedback of alignment parameters.

The means for providing product features 500 and 520 comprises means based on a large number of different techniques and process types such as, different types of printing, embossing, continuous casting, surface coating, laminating, or combinations thereof. Examples of printing techniques comprise screen printing, offset printing, flexo printing, ink-jet printing and the like.

Like above, the arrangement 490 may comprise one or more additional means for providing additional secondary product features 560, wherein an associated registration detection system 580 is arranged to register the mutual alignment of the primary product features and each additional secondary product features and to estimate associated alignment parameters, and the alignment control system 550 is arranged to align each subsequent provision additional secondary product features by controlling each additional means for providing additional secondary product features by feedback of the associated alignment parameters. According to one embodiment there is provided means for providing primary and secondary registration features of a registration structure 510, 530 and 570. As discussed above the means for providing product features 500, 520 and 560 may be integrated with the means for providing registration features of a registration structure 510, 530 and 570 to provide product features and registration features in the same step.

As discussed above, the registration detection system 540, 580 may be arranged so as to register the mutual alignment of the primary and secondary product features at a subsequent position with respect the means for providing said first and secondary product features, or at one of the means for providing said first or secondary product features. The registration detection system 540, 580 may be an optic inspection system, an optic vision analysis system, optic signal measurement system, an acoustic impedance measurement system, a magnetic or electric field impedance measurement system, or the like. In addition to registration of mutual alignment of the primary and secondary features the registration detection system can be used to evaluate quality parameters not related to alignment of the product features, such as material properties of the substrate sheet, deviation from predetermined periodicity, substrate sheet tension, isolated errors, dust, etc.

Figure 17:
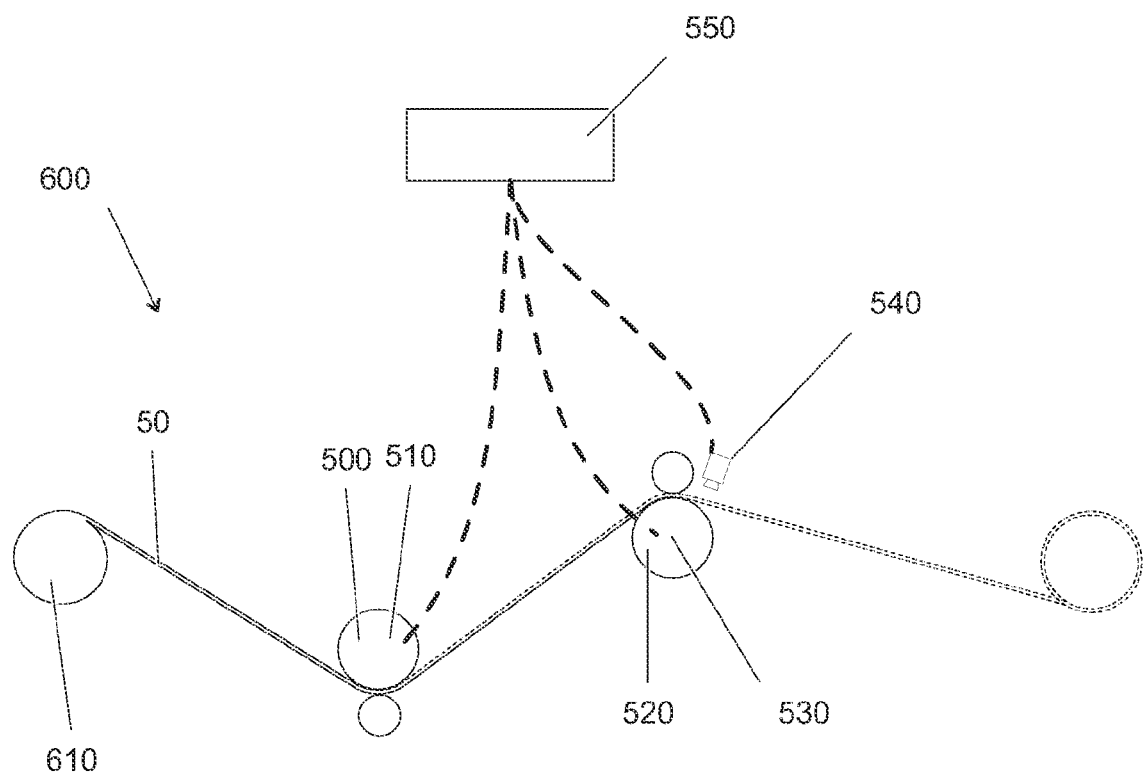
FIG. 17 shows a schematic arrangement for producing a product according to the present invention.
Figure 18:
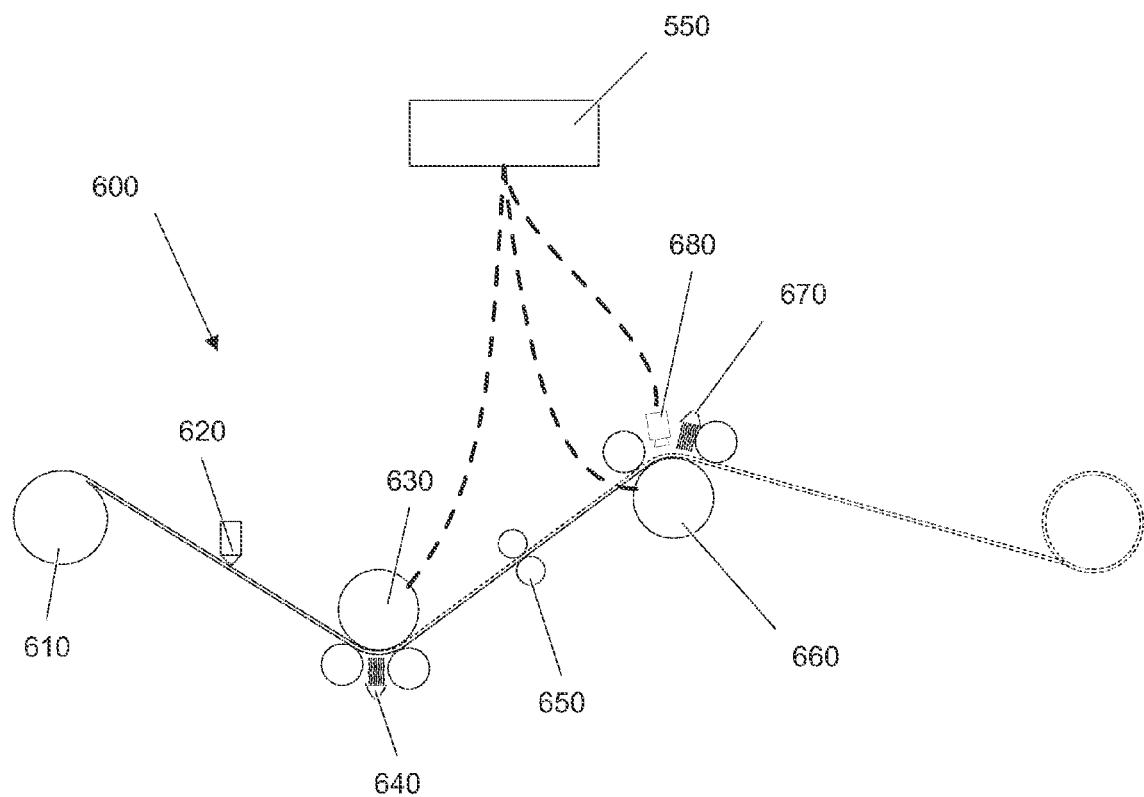
FIG. 18 shows a schematic arrangement for producing a product according to the present invention.

Moreover, as is schematically disclosed in FIGS. 17 and 18 the arrangement for producing a two-sided microstructured product, may be a reel to reel arrangement 600 wherein the substrate 50 is provided in the form of a web on a substrate feed roll 610, and wherein the means for providing product features, 500 and 520, are of roll type.

According to one embodiment, the alignment control system is arranged to control the substrate tension in the translation direction and the transverse direction, and the position of the substrate in the transverse direction.

In an arrangement 490 for producing a two-sided microstructured product in a continuous repeating process along an elongated substrate sheet 50 wherein one or more of the means for providing product features is a rolling arrangement with at least one embossing roll 500, 520, the alignment control system 550 may be arranged to control one or more rolling parameters of the rolling arrangement, selected from: e.g. roll position, roll skew, roll dimensions and roll rotation speed. As mentioned above the roll dimensions may be altered by controlling the roll 500, 520 temperature. Moreover, when the embossing roll comprises an embossing plate formed about the roll and the embossing plate is comprised of a magnetic material and, the alignment control system may be arranged to control the roll dimensions by controlling orientation of magnetic domains therein. Still further, the roll dimensions may be altered by mechanical stretching of the embossing plate.

According to one embodiment, the reel to reel arrangement 490 of FIG. 16 is arranged for producing a two-sided microstructured product such as a holographic device in a continuous reel to reel process, wherein a first surface of a transparent foil substrate is provided with one or more arrays of focusing elements in the form of micro lenses, further comprising one or more registration arrays of focusing elements, by a first roll arrangement 500, e.g. by embossing the surface thereof. A second surface of the transparent foil substrate is provided with one or more arrays of image objects and one or more registration arrays of registration objects being aligned with the image object array, by a second roll arrangement 520, e.g. by printing, embossing or the like providing second reference means at the second surface of the transparent foil substrate, optical means 540 is arranged to register the holographic representation of the registration objects, and to control, in response to a registered misalignment exceeding a predetermined value, second roll arrangement 520 to eliminate the misalignment for subsequent sections of the device.

The reel to reel arrangement 600 of FIG. 18 comprises, a source of substrate foil 610, an applicator 620 for application of a layer of an irradiation curable polymer on one side of the foil substrate 50. A primary product feature embossing roll 630 is arranged to form primary product features in the curable polymer layer and a source of radiation 640 to cure the cureable polymer layer. An applicator 650 is arranged for application of a second layer of an irradiation curable polymer on the opposite side of the foil substrate 50, and a secondary product feature embossing roll 660 is arranged to form secondary product features in the curable polymer layer. A registration detection system 680 is arranged to register the mutual alignment of the primary product features formed in the cured polymer on the first side of the substrate, and secondary product features under formation in the uncured polymer on the second side to estimate alignment parameters. The alignment control system 550 is arranged to align the second product features to the primary product features prior to curing the second polymer layer by controlling one or more rolling parameters of the secondary product feature embossing roll 660 in response to a registered misalignment exceeding a predetermined value.

A source of radiation 670 for curing the transparent polymer layer is arranged after the registration detection system 680.

According to one embodiment the reel to reel arrangement 600 of FIG. 18 is arranged for production of holographic devices. The reel to reel arrangement 600 comprises, a source of transparent foil 610, an applicator 620 for application of a layer of an irradiation curable transparent polymer on one side of the transparent foil substrate 50, a lens roll 630 arranged to form an array of micro lenses in the transparent polymer layer, a source of radiation 640 for curing the transparent polymer layer, an applicator 650 for application of a layer of an irradiation curable transparent polymer on the opposite side of the transparent foil substrate 50, a image object roll 660 arranged to form an array of image objects and one or more registration arrays of registration objects being aligned with the image object array in the transparent polymer layer, optical means 680 arranged to register the holographic representation of the registration objects, and to control, in response to a registered misalignment exceeding a predetermined value, image object roll 660 to eliminate the misalignment for subsequent sections of the device and a source of radiation 670 for curing the transparent polymer layer after the alignment is performed.

Figure 19:
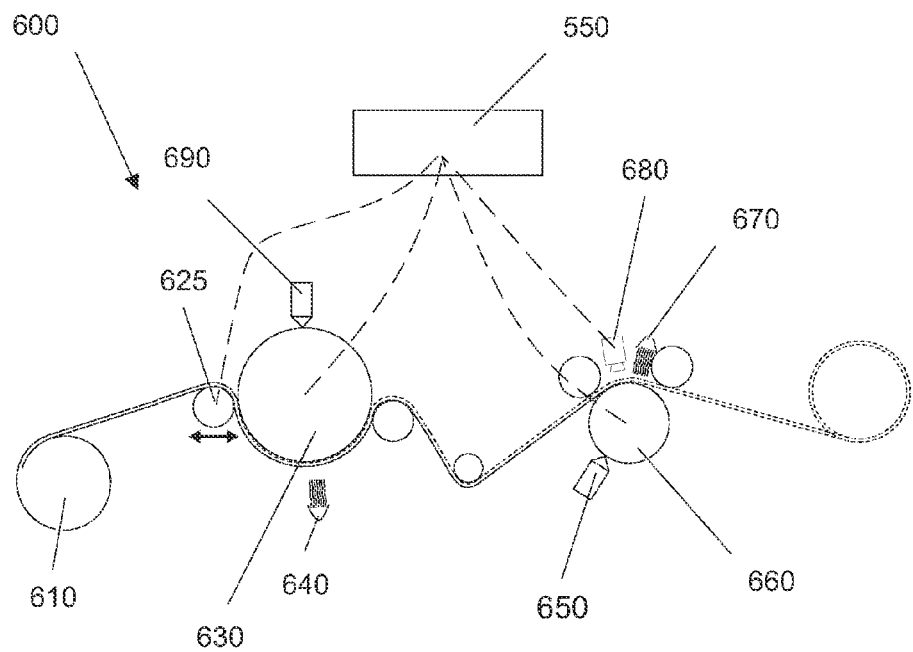
FIG. 19 schematically illustrates a reel to reel arrangement in accordance with the present invention.

The reel to reel arrangement 600 of FIG. 19 comprises a primary product feature embossing roll 630 and a pressure roll 625 in contact with a substrate foil fed from a source of substrate foil 610 in between. An applicator 690 is arranged to apply an irradiation curable polymer to the primary features embossing roll 630 whereby the primary feature embossing roll 630 is arranged to form primary product features in a curable polymer layer on the substrate foil 610 at the pressure roll 625. A source of radiation 640 is arranged to cure the cureable polymer layer. An applicator 650 is arranged for application of a second layer of an irradiation curable polymer on a secondary product feature embossing roll 660 that is arranged to form secondary product features in a curable polymer layer on the substrate foil. A registration detection system 680 is arranged to register the mutual alignment of the primary product features formed in the cured polymer on the first side of the substrate, and secondary product features under formation in the uncured polymer on the second side to estimate alignment parameters. The alignment control system 550 is arranged to align the second product features to the primary product features prior to curing the second polymer layer by controlling one or more rolling parameters of the secondary product feature embossing roll 660 in response to a registered misalignment exceeding a predetermined value.

Further, the alignment control system 550 is arranged to align the second product features to the primary product features in a direction normal to the surface of the foil, i.e. the thickness of the curable polymer layer applied at the applicator roll 625, by adjusting one or more of: the position and/or pressure of the pressure roll 625, the temperature of the primary feature embossing roll 630, the viscosity of the curable polymer, etc. A source of radiation 670 for curing the transparent polymer layer is arranged after the registration detection system 680.

According to one embodiment the reel to reel arrangement 600 of FIG. 19 is arranged for production of holographic devices. The reel to reel arrangement 600 comprises, a source of transparent foil 610, an applicator 690 for application of a layer of an irradiation curable transparent polymer on a lens roll 630 arranged to form an array of micro lenses in the transparent polymer layer, a source of radiation 640 for curing the transparent polymer layer, an applicator 650 for application of a layer of an irradiation curable transparent polymer on the opposite side of the transparent foil substrate 50, a image object roll 660 arranged to form an array of image objects and one or more registration arrays of registration objects being aligned with the image object array in the transparent polymer layer, optical means 680 arranged to register the holographic representation of the registration objects, and to control, in response to a registered misalignment exceeding a predetermined value, image object roll 660 to eliminate the misalignment for subsequent sections of the device and a source of radiation 670 for curing the transparent polymer layer after the alignment is performed.

While the invention has been described in connection with what is presently considered to be the most practical and preferred embodiments, it is to be understood that the invention is not to be limited to the disclosed embodiments, on the contrary, it is intended to cover various modifications and equivalent arrangements within the appended claims.

The invention claimed is:

1. A method of producing a two-sided microstructured product comprising the steps of:
    providing primary product features at a first surface of a substrate sheet;
    providing secondary product features at an opposed surface of the substrate sheet;
    providing primary registration features comprising a registration-array of focusing elements on the first surface of the substrate sheet; and
    providing secondary registration features comprising a registration-array of reference objects on the opposed surface of the substrate sheet, wherein the primary registration features are aligned with the primary product features at the first surface of the substrate sheet and the secondary registration features are aligned with the secondary product features at the opposed surface of the substrate sheet, and the registration-array of focusing elements and the registration-array of reference objects are arranged to provide a synthetic integral three dimensional image perceivable as a representation of the reference objects, wherein the registration-array of reference objects comprises one or more pairs of adjacent complementary sub arrays of reference objects that have different periods of repetition in at least one direction, so that the one or more pairs of complementary sub arrays gives rise to deviating synthetic integral three dimensional image representation effects in response to a misalignment;
    registering with a registration detection system the mutual alignment of the primary and secondary product features to estimate alignment parameters, involving identification of the relative positions of the primary and the secondary registration features of the registration structure, wherein the synthetic integral three dimensional image is used to improve the accuracy of the registration features; and
    aligning the provision of primary and secondary product features with an alignment control system by controlling at least one step of providing product features by feedback of alignment parameters.

2. The method according to claim 1, wherein:
    providing the primary product features comprises providing an array of micro-lenses at the first surface of a substrate sheet; and
    providing the secondary product features comprises providing an array of image objects at the opposed surface of the substrate sheet.

3. The method according to claim 1, further comprising the steps of:
    providing the primary and the secondary registration features so that each focusing element is arranged to magnify a small section of an associated reference object so that the registration-array of focusing elements and the registration-array of reference objects are arranged to provide a synthetic integral three dimensional image perceivable as a magnified representation of the reference objects and so that relative misalignments between the arrays are magnified in the synthetic integral three dimensional image; and
    registering the mutual alignment of the primary and secondary product features to estimate alignment parameters by registering the mutual alignment between said primary registration features and secondary registration features, wherein the synthetic integral three dimensional image and the magnifying effect are used to improve the accuracy of the registration features.

4. The method of claim 1, wherein the one or more pairs of adjacent complementary sub arrays of reference objects comprises bar shaped reference objects.

5. The method of claim 1, wherein the method comprises providing a registration array of reference objects comprising two or more pairs of complementary sub-arrays of reference objects, wherein the first pair is arranged to display misalignments in a first direction and the second pair is arranged to display misalignments in a second direction, different from the first.

6. The method according to claim 1, wherein the steps of providing primary product features and providing secondary product features comprises the steps of repeatedly providing a set of primary product features and a set of secondary product features in a continuous process along the substrate sheet, and the registration structure is repeated essentially continuously in a feeding direction, wherein a first pair of the one or more pairs of complementary sub arrays of reference objects is arranged to display misalignment transverse to the feeding direction, and wherein the repeating registration structure is formed so that the reference objects in said first pair are distinguishable from each other in the feeding direction.

7. The method according to claim 1, wherein the step of registering the mutual alignment of the primary and secondary product features is performed subsequent the steps of providing said first and secondary product features.

8. The method according to claim 1, wherein the step of registering the mutual alignment of the primary and secondary product features is performed simultaneous with the step of providing said first or secondary product features.

9. The method according to claim 1, wherein the step of registering the mutual alignment of the primary and secondary product features involves the step of identifying the relative position of the primary and secondary features in a direction normal to the surface of the substrate sheet.

10. The method according to claim 1, wherein the step of registering the mutual alignment of the primary and secondary product features involves the step of identifying the relative position of the primary and secondary features in three dimensions.

11. The method according to claim 1, wherein one or more of the steps of providing product features is performed by a rolling process with at least one embossing roll.

12. The method according to claim 11, wherein controlling the at least one step of providing product features involves controlling one or more of the parameters selected from the group consisting of roll temperature, roll position, roll skew, roll dimensions and roll rotation speed for at least one roll, tension of the substrate sheet in a translation direction, and tension of the substrate sheet in a transverse direction.

13. The method according to claim 11, wherein a curable polymer is applied to the substrate sheet at a pressure roll that is arranged at the embossing roll and controlling the at least one step of providing product features involves controlling the pressure and/or position of the pressure roll in relation to the embossing roll.

14. The method according to claim 11, wherein the embossing roll comprises an embossing plate formed as a sleeve about the roll.

15. A two-sided microstructured product comprising:
primary product features provided at a first surface;
secondary product features provided at an opposed surface in alignment with the primary product features;
a registration-array of focusing elements at the first surface; and
a registration-array of reference objects at the opposed surface,
wherein the registration-array of focusing elements is aligned with primary product features at the first surface and the registration-array of reference objects is aligned with secondary product features at the opposed surface, wherein the first and second registration features are provided so that each focusing element is arranged to magnify a small section of an associated reference object so that the registration-array of focusing elements and the registration-array of reference objects are arranged to provide a synthetic integral three dimensional image perceivable as a magnified representation of the reference objects and so that relative misalignments between the arrays are magnified in the synthetic integral three dimensional image, and wherein the registration-array of reference objects comprises one or more pairs of adjacent complementary sub arrays of reference objects that have different periods of repetition in at least one direction so that the one or more pairs of complementary sub arrays gives rise to deviating synthetic integral three dimensional image representation effects in response to a misalignment.

16. The two-sided microstructured product according to claim 15, wherein:
the primary product features comprise an array of micro-lenses at the first surface of a substrate sheet; and
the secondary product features comprise an array of image objects at the opposed surface of the substrate sheet.

17. The two-sided microstructured product according to claim 15, wherein the one or more pairs of adjacent complementary sub arrays of reference objects comprises bar shaped reference objects.

18. The two-sided microstructured product according to claim 15, comprising two pairs of complementary sub arrays of reference objects, wherein the first pair is arranged to display misalignment in a first direction and the second pair is arranged to display misalignment in a second direction, different from the first.

19. The two-sided microstructured product according to claim 15 arranged for a continuous production process with a feeding direction and an alignment process of direct feedback type, wherein the registration structure is repeated essentially continuously in the feeding direction, wherein a first pair of the one or more pairs of complementary sub arrays of reference objects is arranged to display misalignment transverse to the feeding direction, and wherein the repeating registration structure is formed so that the reference objects in said first pair are distinguishable from each other in the feeding direction.

20. The two-sided microstructured product according to claim 15, wherein at least one of the primary product features and the registration-array of focusing elements at the first surface comprise half-spherical micro-lenses.

21. An apparatus for producing a two-sided microstructured product in a continuous process along an elongated substrate sheet comprising:
means for providing primary product features at a first surface of the substrate sheet;
means for providing secondary product features at the opposed surface of the substrate sheet;
means for providing primary registration features comprising a registration array of focusing elements on the first side of the substrate sheet, which primary registration features are aligned with the primary product features at the first surface of the substrate sheet;
means for providing secondary registration features comprising a registration array of reference objects on the opposed side of the substrate sheet, which secondary registration features are aligned with the secondary product features at the opposed surface of the substrate sheet, wherein the registration-array of focusing elements and the registration-array of reference objects are arranged to provide a synthetic image perceivable as a representation of the reference objects, wherein the registration-array of reference objects comprises one or more pairs of adjacent complementary sub arrays of reference objects that have different periods of repetition in at least one direction, so that the pair of complementary sub arrays gives rise to deviating synthetic integral three dimensional image representation effects in response to a misalignment;
a registration detection system arranged to register the mutual alignment of the primary and secondary product features and to estimate alignment parameters, involving identification of the relative positions of the primary and the secondary registration features of the registration structure, wherein the synthetic integral three dimensional image is used to improve the accuracy of the registration features, and
an alignment control system arranged to align the provision of primary and secondary product features by controlling at least one of the means for providing product features by feedback of alignment parameters.

22. The apparatus for producing a two-sided microstructured product according to claim 21, wherein:
- the means for providing the primary product features provides an array of micro-lenses at the first surface of a substrate sheet; and
- the means for providing the secondary product features provides an array of image objects at the opposed surface of the substrate sheet.

23. The apparatus for producing a two-sided microstructured product according to claim 21, wherein the means for providing primary registration features and the means for providing secondary registration features provides first and second registration features so that each focusing element is arranged to magnify a small section of an associated reference object so that the registration-array of focusing elements and the registration-array of reference objects are arranged to provide a synthetic integral three dimensional image perceivable as a magnified representation of the reference objects and so that relative misalignments between the arrays are magnified in the synthetic integral three dimensional image, and the registration detection system is arranged to use the synthetic integral three dimensional image and the magnifying effect to improve the accuracy of the registration features.

24. The apparatus for producing a two-sided microstructured product according to claim 21, wherein one or more of means for providing first and second product features comprises an embossing roll.

25. The apparatus for producing a two-sided microstructured product according to claim 24, wherein the alignment control system comprises means for controlling one or more of the parameters selected from the group consisting of roll temperature, roll position, roll skew, roll dimensions and roll rotation speed for at least one roll, tension of the substrate sheet in a translation direction, and tension of the substrate sheet in a transverse direction.

26. The apparatus for producing a two-sided microstructured product according to claim 23, further comprising:
- means for applying a curable polymer to the substrate sheet at a pressure roll that is arranged at the embossing roll; and
- means for controlling the pressure and/or position of the pressure roll in relation to the embossing roll.

27. The apparatus for producing a two-sided microstructured product according to claim 24, wherein the embossing roll comprises an embossing plate formed as a sleeve about the roll.

* * * * *